Oct. 8, 1940.   R. L. RUDE   2,217,636
HYDROCARBON CONVERSION PROCESS AND APPARATUS THEREFOR
Filed Aug. 24, 1939   20 Sheets-Sheet 2

Inventor:
Robert L. Rude

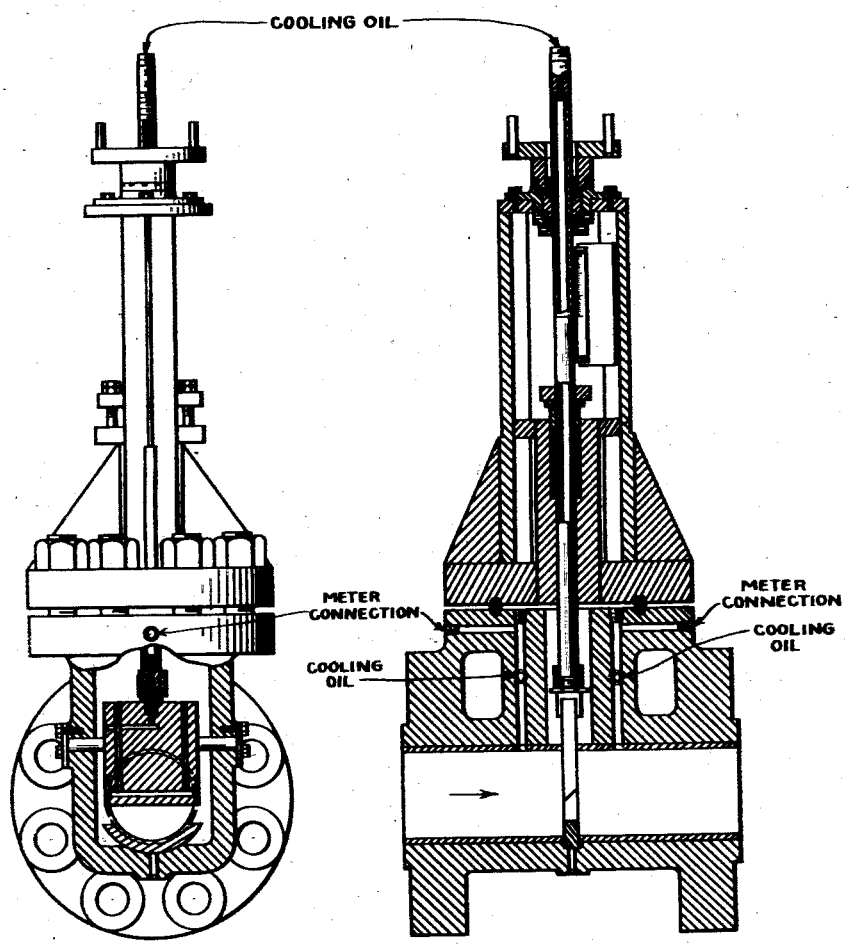

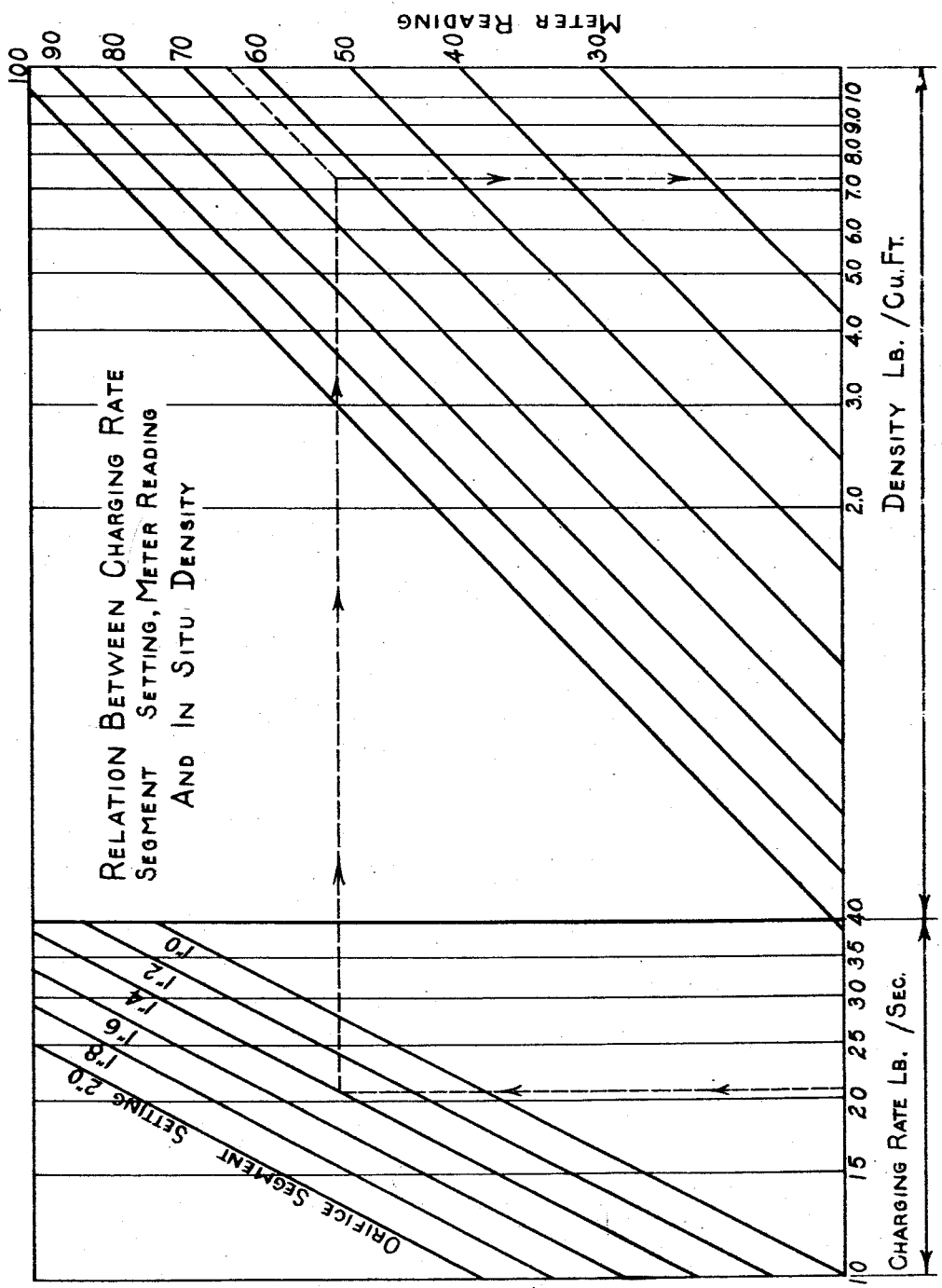

Oct. 8, 1940.   R. L. RUDE   2,217,636
HYDROCARBON CONVERSION PROCESS AND APPARATUS THEREFOR
Filed Aug. 24, 1939   20 Sheets-Sheet 6

Oct. 8, 1940.  R. L. RUDE  2,217,636
HYDROCARBON CONVERSION PROCESS AND APPARATUS THEREFOR
Filed Aug. 24, 1939  20 Sheets-Sheet 7

Inventor
Robert L. Rude.
By Ames, Phiss, Olson & Mecklenburger
Attys.

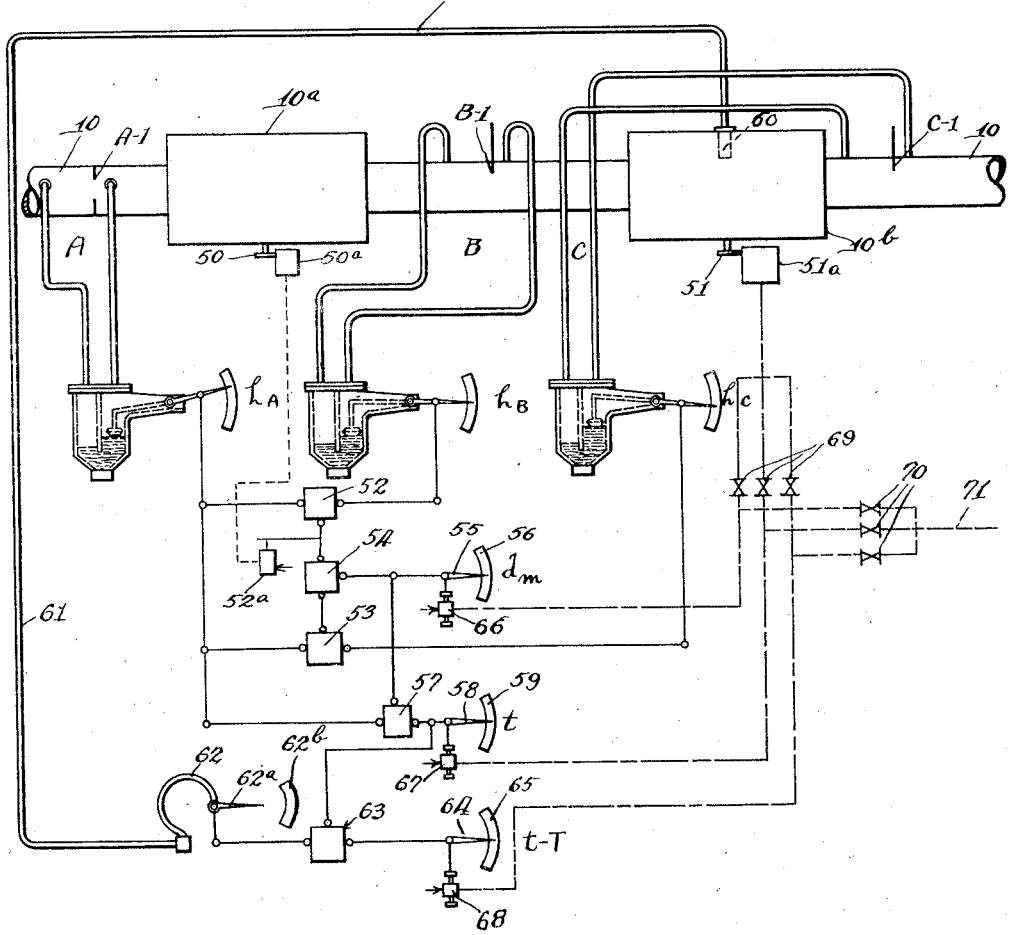

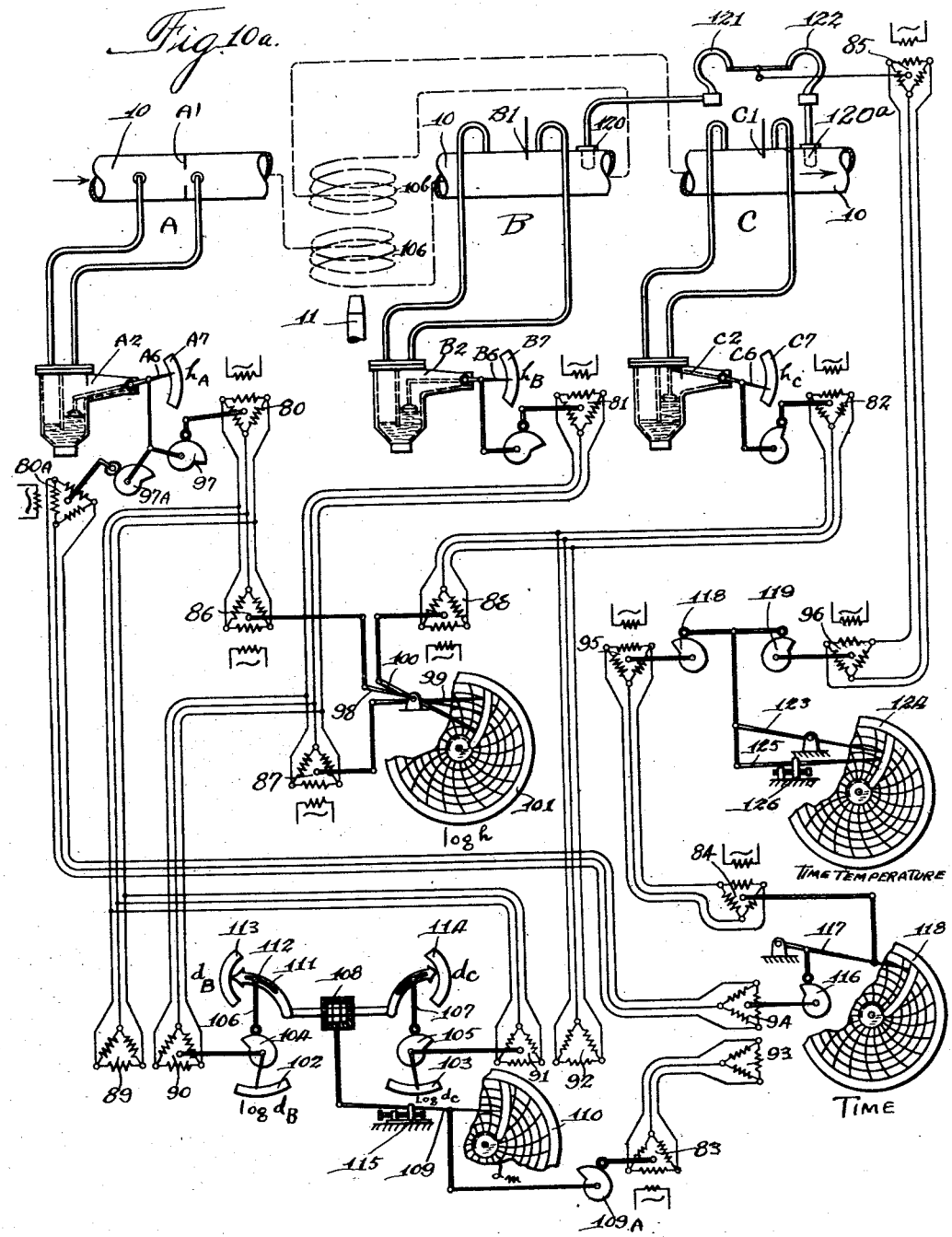

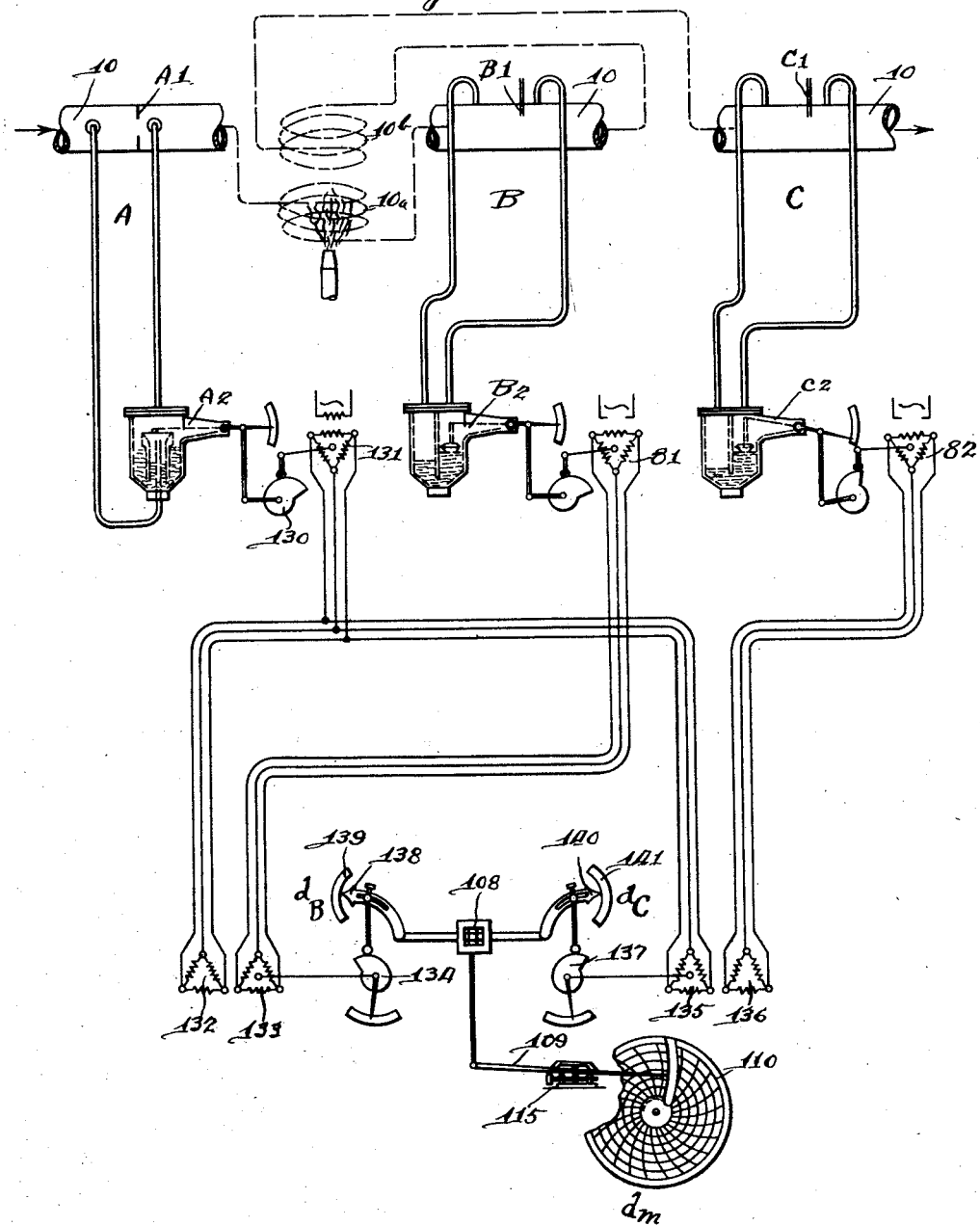

Oct. 8, 1940.  R. L. RUDE  2,217,636
HYDROCARBON CONVERSION PROCESS AND APPARATUS THEREFOR
Filed Aug. 24, 1939  20 Sheets-Sheet 11

Inventor:
Robert L. Rude.
By Amos, Thiess, Olsen & Mecklenburger
Attys.

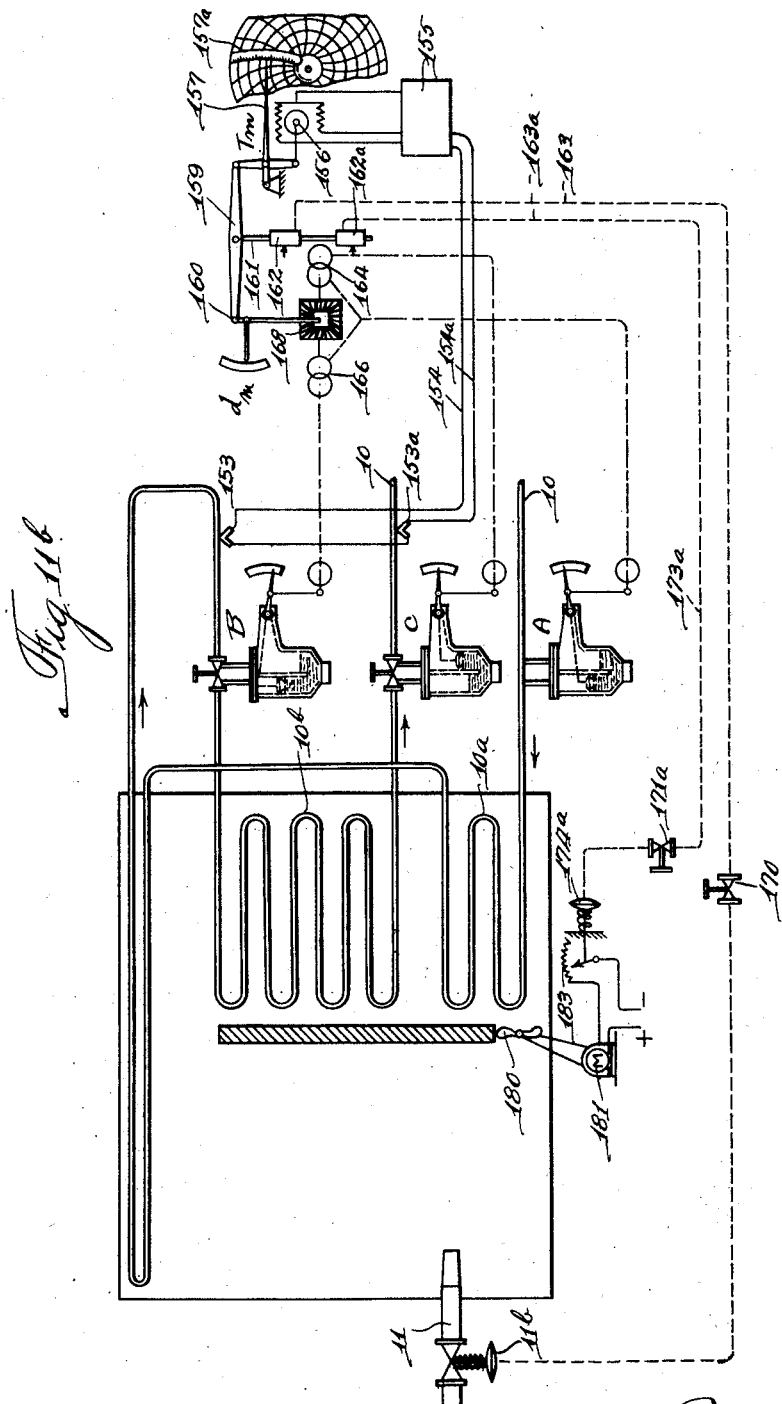

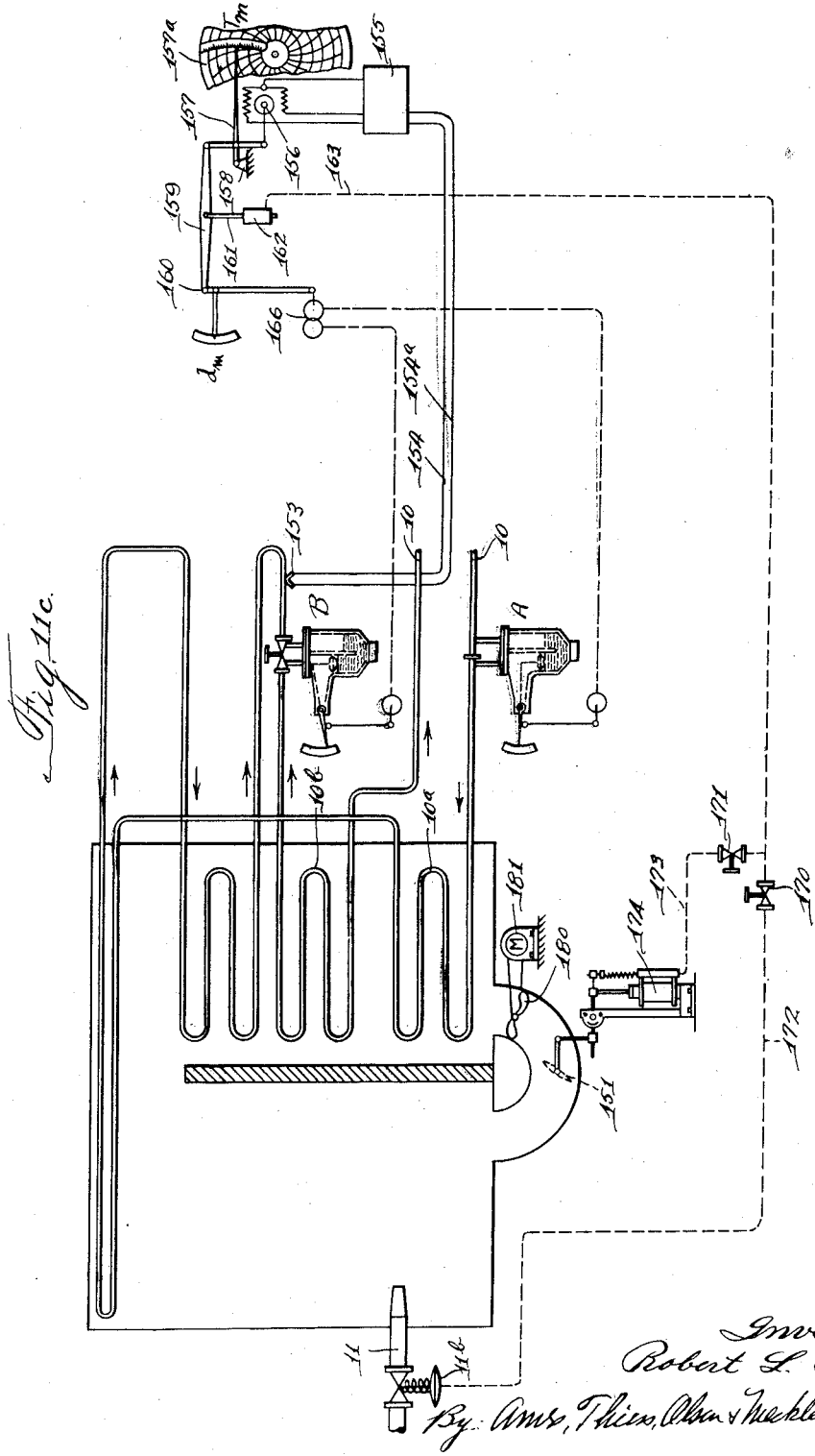

Oct. 8, 1940.  R. L. RUDE  2,217,636
HYDROCARBON CONVERSION PROCESS AND APPARATUS THEREFOR
Filed Aug. 24, 1939   20 Sheets-Sheet 14
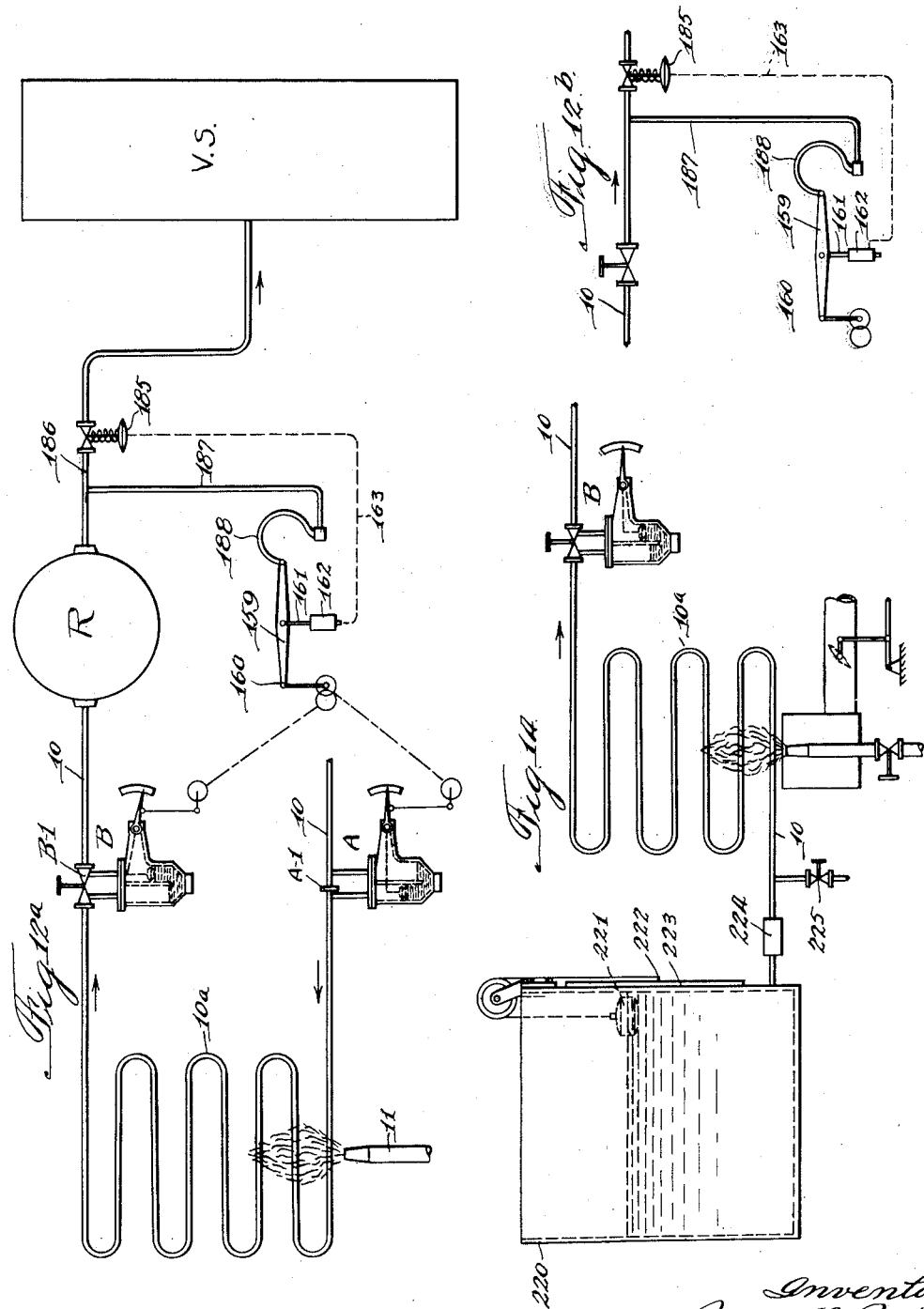

Oct. 8, 1940.   R. L. RUDE   2,217,636
HYDROCARBON CONVERSION PROCESS AND APPARATUS THEREFOR
Filed Aug. 24, 1939   20 Sheets-Sheet 15
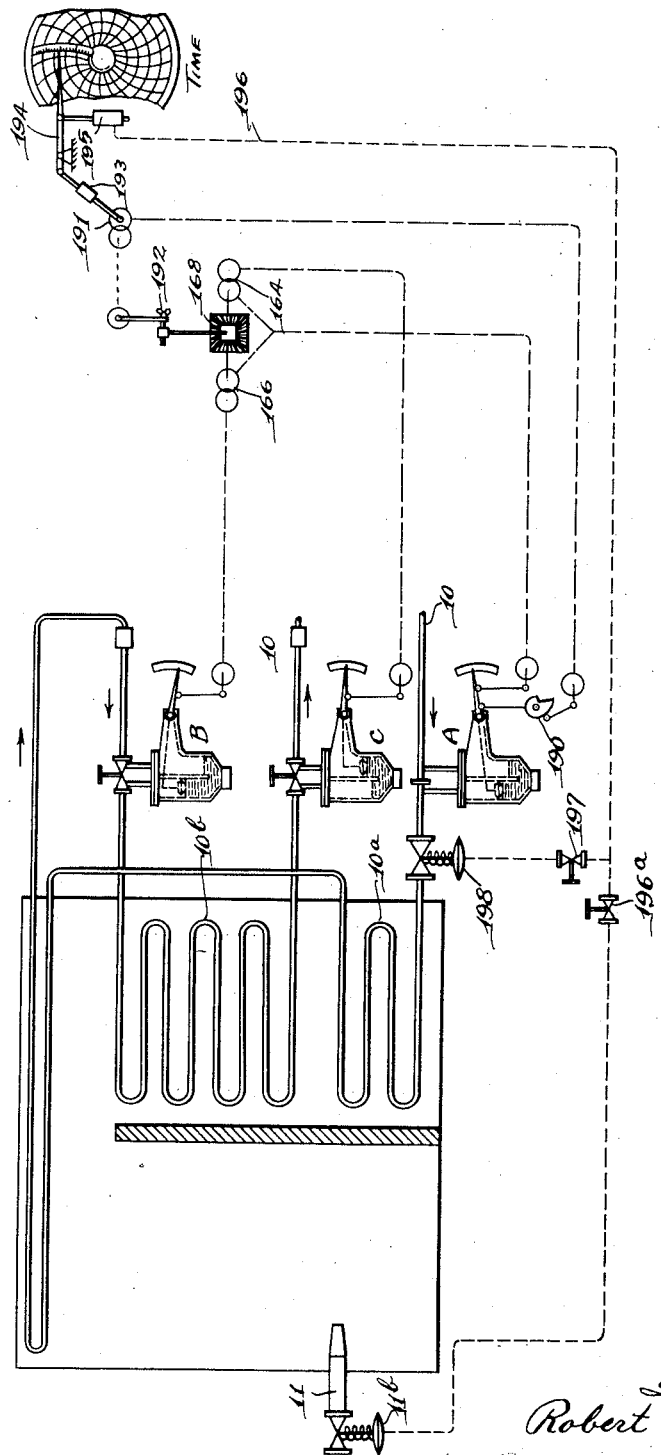
Inventor
Robert L. Rude

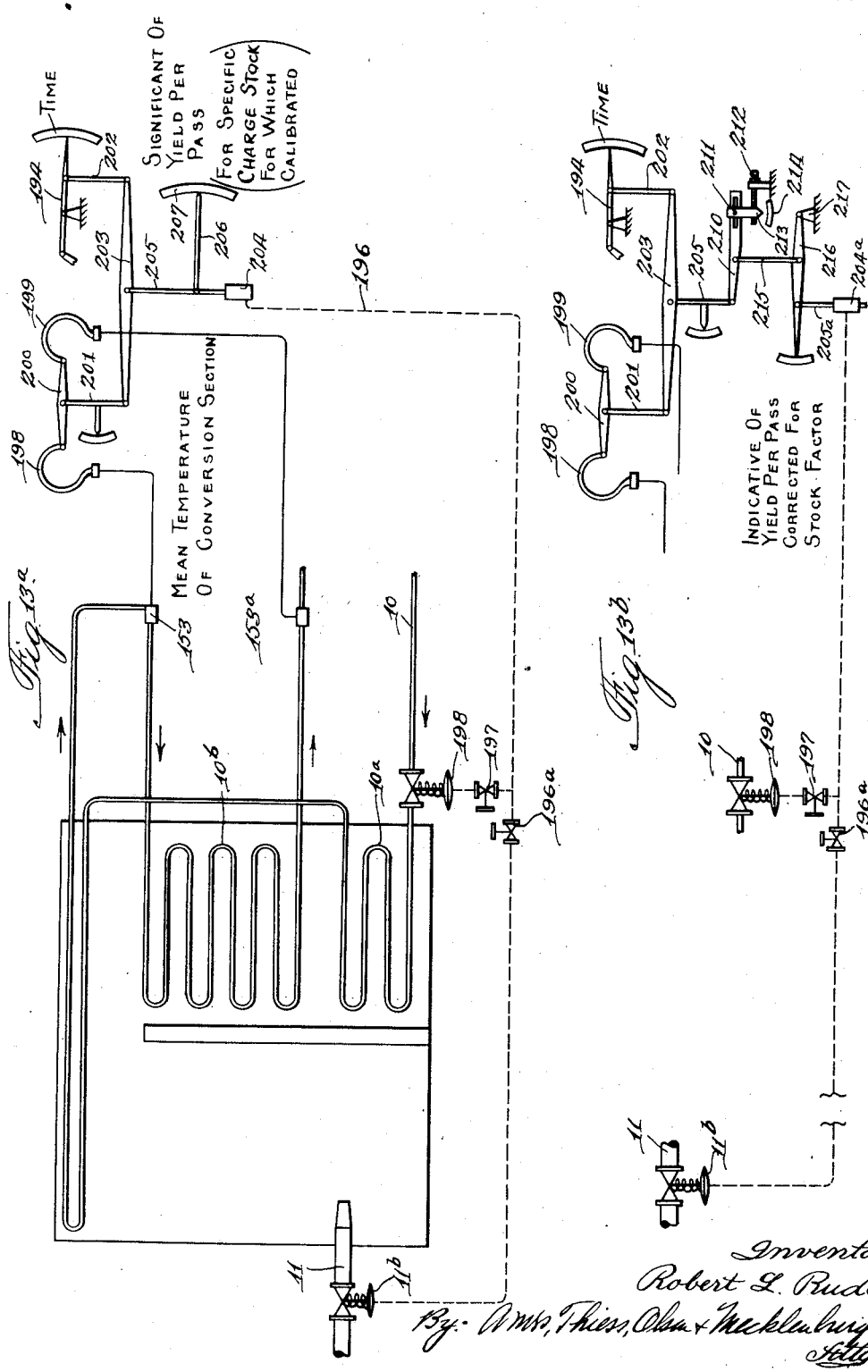

Oct. 8, 1940.  R. L. RUDE  2,217,636

HYDROCARBON CONVERSION PROCESS AND APPARATUS THEREFOR

Filed Aug. 24, 1939  20 Sheets-Sheet 18

Inventor:
Robert L. Rude.

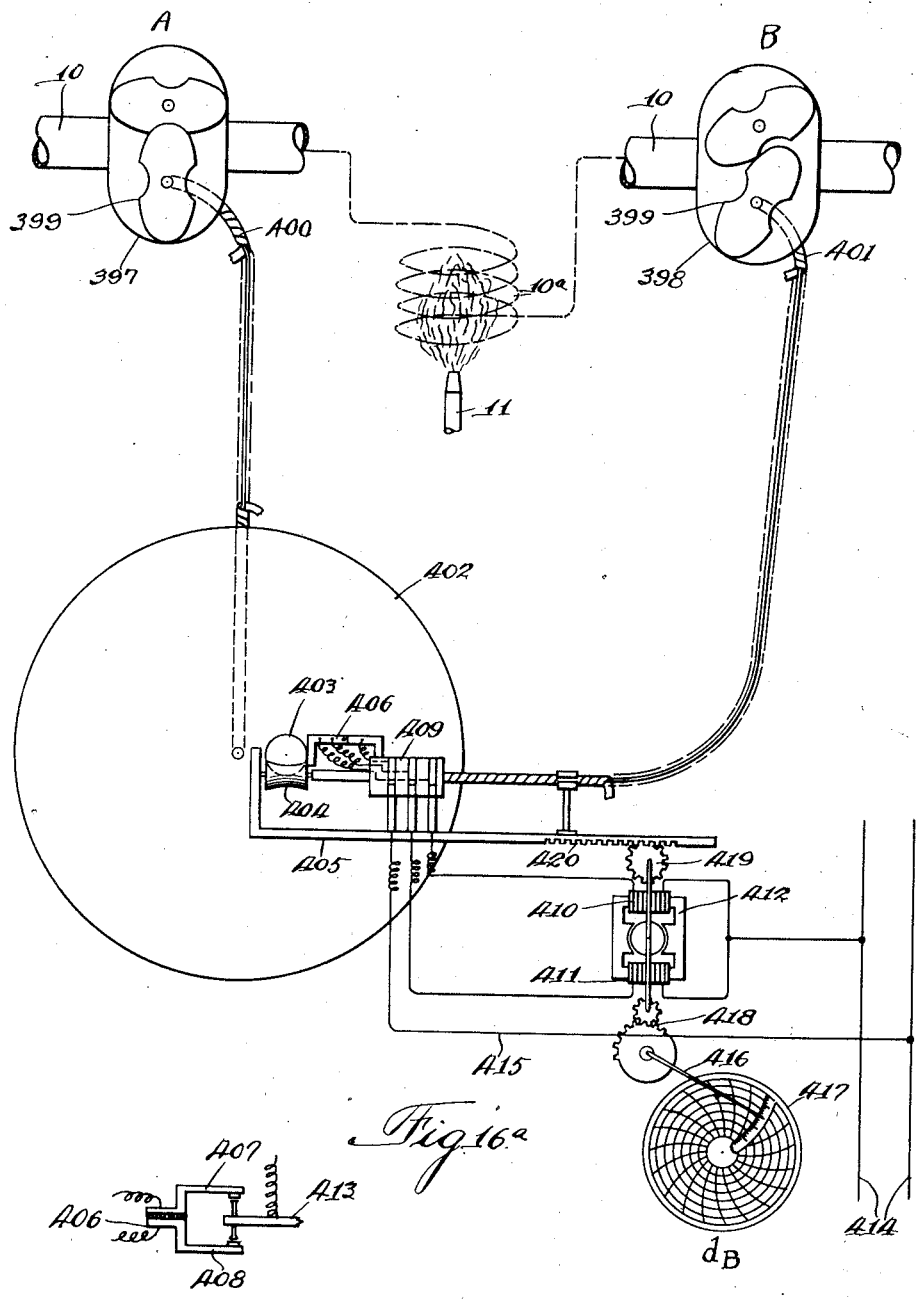

Fig. 17

Patented Oct. 8, 1940

2,217,636

UNITED STATES PATENT OFFICE 2,217,636

HYDROCARBON CONVERSION PROCESS AND APPARATUS THEREFOR

Robert L. Rude, Toronto, Ontario, Canada, assignor to The British American Oil Company, Limited, Toronto, Ontario, Canada, a corporation of Canada Application August 24, 1939, Serial No. 291,643

36 Claims. (Cl. 196—47)

This application is a continuation-in-part of my copending applications Serial No. 700,485, filed December 1, 1933, and Serial No. 152,860, filed July 9, 1937.

The present invention relates broadly to a new and improved process and apparatus for effecting conversion of hydrocarbons in a flow system to produce desirable products, either by means of a physical change, or a chemical change, or both. More particularly, the invention relates to such a process wherein the essential variables are made manifest and employed for the more efficient control of the conversion.

In a static system it is a simple matter to determine the essential variables upon which the course of hydrocarbon conversion depends, namely, temperature (as affected by heat absorption), time of treatment, the character of the hydrocarbon under treatment, the concentration of the various reactants, and presence or absence of catalysts. However, when hydrocarbon transformations are carried out in a flow system, no methods or means have been available, prior to the present invention, for determining or making manifest, either continuously or directly, the time of treatment. It is clear that without a method of ascertaining time directly, the recognition of the existence of time-temperature relationships is in itself of small assistance in the practical operation of flow systems for hydrocarbon conversion. Accordingly, the control of such systems has been heretofore limited to the regulation of temperature, pressure, and rate of charge.

In order to enable the operator to regulate the flow system to maintain a selected degree of conversion therein, it is necessary to provide a control means which is responsive to the state of the fluid and which affords a composite expression of the way in which changes in the essential operating variables are interrelated. Early in the development of the cracking art, the practice of withdrawing samples from the flow system was resorted to with the object of obtaining information regarding the state of the fluid under flowing conditions. Such sampling procedure, however, was recognized as inadequate at least as early as 1922, when Dean (United States Bureau of Mines, Technical Paper 258, page 46) pointed out that this method consumes "just enough time to make the information it supplies history instead of news."

On the basis of the gas laws attempts were made to compute the time of treatment from the analyses of withdrawn samples, but it was appreciated that the results were likely to be extremely inaccurate. Thus, Weir and Eaton (Journal of Industrial and Engineering Chemistry 29, 346, at 350, 1937) stated that even when the reaction-time so calculated was "corrected" with all available factors, the result might still be "in error up to possibly 100%." Moreover, Lewis (Journal of Industrial and Engineering Chemistry 28, 257, 1936) pointed out that the introduction of new high-pressure operations leads into ranges in which it is known that the deviations from the gas laws might reach several hundred per cent, and that for the design and control of industrial operations such as cracking, "it has become imperative to know the properties of all sorts of substances and mixtures under high pressure conditions." Because of the difficulty encountered in obtaining such information, the author concluded that "it is easy to appreciate the despair of the worker in chemical industry of finding adequate data on the numberless compounds with which he may be called upon to operate."

The foregoing citations are indicative of the admitted inability of the prior art to supply method or means for obtaining manifestations of the state of the fluid, essential for the design and control of hydrocarbon conversion processes.

The principal object of the present invention is to provide a process and apparatus which obviates the deficiencies of the prior art, by permitting the regulation of hydrocarbon conversion in a flow system so that the essential variables entering into such conversion may be made directly and continuously manifest, and effectively utilized. Another object is to provide a method and means for determining these variables, from which the process of hydrocarbon conversion in a flow system may be controlled if desired. A further object is to provide a method and means, responsive to the essential variables, to effect control of the process whereby substantially to maintain conversion at an optimum degree.

A still further object is to provide a method and means for the determination and correlation of time, temperature and character of charging stock; for the determination of the relation of these variable to the degree of conversion; and for the utilization of these factors for control of the process.

Another object is to determine and control the thermal efficiency of the process and the effect on the process of variable stock character such as that encountered, for example, in the selective treatment of petroleum fractions, in gas recirculation, and the like.

The foregoing and many other objects may be accomplished in accordance with the present invention as hereinafter more particularly described and claimed. The invention is based, in part, upon the discovery that the density of the hydrocarbon while in process of treatment (i. e., in situ density, as distinguished from the density determined by prior art methods such as sampling, for example), may be employed to provide a new and useful basis for the control of operating conditions and degree of conversion in a continuous hydrocarbon flow system. It has further been found that manifestations of in situ density permit the determination of time of treatment, which latter may be correlated with the temperature of treatment and with the character of the hydrocarbon stock, to arrive at the degree of conversion of the fluid processed. The recognition of the significance of this discovery has permitted the design and control of a novel process and apparatus for effecting hydrocarbon conversion under conditions of greater flexibility, efficiency, economy, and safety than heretofore attainable, thereby resulting in increased yields and higher quality of product.

The method and means by which the determination and utilization of in situ density or manifestations thereof are effected in accordance with the present invention, involves the use of one or more flow-responsive elements, each of which consists of a primary element in contact with the fluid, and a secondary element which indicates, records, or transmits the response of the primary element. Such flow-responsive elements, when employed to determine the rate of flow of fluids, are commonly referred to as "fluid meters" or "flow-metering" devices, and are fully described as such in "Fluid meters," American Society of Mechanical Engineers, third edition, 1931, or fourth edition, 1937. When used in accordance with the present invention, however, such devices aptly may be termed "density-responsive" elements.

A typical form of primary element consists of a restriction (orifice, venturi, nozzle, or the like) inserted in the path of flow of the fluid; and a typical secondary element consists of a manometer, the indications of which follow the variations in the differential pressure across the restriction. While the disclosure of the present invention makes illustrative use of restrictions in the path of flow and of differential pressure gauges and the like, it should be understood that flow-responsive elements generally may be substituted for those hereinafter specifically illustrated.

As before mentioned, in endeavoring to obtain and maintain optimum conditions and optimum degrees of conversion in the processing of hydrocarbon fluids, prior investigators were restricted to knowledge derived from treating given stocks at different temperatures and pressures. While it was recognized that time of treatment constitutes an essential factor in the process, no satisfactory method of determining or controlling this variable was available prior to the present invention. By the utilization of the essential variables affecting conversion, it has been found possible to develop and control conversion systems in a manner possessing many outstanding advantages over those disclosed by the prior art.

In the following discussion, the hydrocarbon conversion process of the present invention will be exemplified by reference to thermal cracking. It should be understood, however, that the invention relates broadly to hydrocarbon conversion in a flow system, irrespective of whether the conversion is physical, or chemical, or both. There are many operations in processing petroleum hydrocarbons where a flow system is utilized, and it will be apparent to those skilled in the art that the principles of the present invention may be applied thereto, to provide valuable contributions to the methods of control and to the design of such a processing system. All such applications are therefore to be understood as included within the contemplation of the present invention.

The essential factors affecting the degree of conversion in pyrolytic cracking are time, temperature, and character of charging stock. In a flow system the charging rate and pressure enter into these factors through their effect on time, and hence on the temperature required to effect the desired conversion. In accordance with the present invention, the density of the fluid at successive stages in the process may be utilized to arrive at the time of treatment. Flow-responsive elements give indications of the in situ density from which numerical values of density and time may be derived and correlated with the other factors in the control of the process. It should be appreciated, however, that for processing under selected conditions of temperature, pressure, and rate of charge, the indications of the flow-responsive elements provide a reliable and sensitive guide for controlling the process, due to the fact that flow-responsive elements respond to changes in control variables more proptly and more sensitively than do any of the control means utilized in the prior art. It is therefore contemplated, in accordance with a further aspect of the present invention, to supplement prior art control steps with flow-responsive elements sensitive to changes in the state of the fluid, and by utilizing relationships between the indications of these flow-responsive elements and the indications of other operating variables, to effect an improved control of the process. It is possible, where desired, to arrive at the values of the indications of the flow-responsive elements which correspond to predetermined operating conditions. Graphs may be constructed empirically for the flow system in question, in order to correlate time and temperature with the character of the charging stock to attain a selected yield per pass.

The present invention further contemplates methods and means for the automatic determination and correlation of the factors influencing hydrocarbon conversion in a flow system, thereby providing for control of the essential variables of the process. The method and means for automatic correlation permit relationships between the factors to be expressed in convenient numerical form, and also to be recorded if desired.

In accordance with another aspect of the present invention, it has been found that the manifestations of the density of the fluid at successive points along the flow path supply a practical and efficient basis for controlling the degree of heat absorption. This is of particular advantage when utilizing a density-responsive device for controlling the rate of heat liberation of fuel fired. The desirable features of a density-responsive element as a control means reside in its sensitivity to the essential variable entering into the control of the process. This sensitivity and promptness of response are such that when a given flow system is subjected to upset operating conditions, a change in one variable may compensate for that in another, so far as the effects of these changes on the density-responsive elements are concerned. Thus it is possible, by controlling from density, to restore the unit to normal conditions far more quickly and effectively than with the prior art methods of control.

For example, in a unit equipped with density-responsive elements for controlling the fuel fired in the heating section of a cracking furnace, it was observed that on an occasion where the fuel fired dropped abruptly by a substantial amount (owing to a failure in gas supply), the drop in temperature caused an increase in density and the drop in pressure caused a decrease in density and an increase in the rate of charge. The density-responsive equipment from which the fuel fired was controlled, being sensitive to the combined effect of these variations, restored the unit to normal operating conditions when the usual gas supply was again made available, and no tendency to overshoot or set up cycling in the system was observed.

In accordance with still another aspect of the invention, the fuel fired in the conversion section of a cracking furnace may be controlled from relations between the indications of means responsive to time and temperature, such relations being found by solving mechanically an empirical relation (vide infra) established to correlate degree of conversion with time, temperature, and character of charging stock. With this basis for control of the fuel fired to the conversion section, it has been observed that the means responsive to time are sensitive (in the same way as is the density in the heating section) to changes in the operating variables. The sensitivity of a control involving time, and the compensating effects on the time of changes in operating conditions, makes it possible, after a disturbance, to restore the unit to normal conditions without cycling or overshooting.

An important advantage of a control system which utilizes the density of the fluid in a manner such as that just described, is that the effect on the system of a major disturbance is to reduce the rate of fuel fired. This is a direct consequence of the way in which the density of the fluid responds to changes in operating conditions. The system thus exhibits a desirable safety feature. For example, it was observed, when trouble with the charge pump reduced the rate of charge abruptly by a substantial amount, that the decreased rate resulted in a decrease in density in the heating section and an increase in time in the conversion section. The control system based on density reduced the fuel fired in both sections and lowered materially the corresponding temperatures, contrary to the behaviour of a control system based on temperature, where (as is appreciated by those skilled in the art) a decreased rate of charge may result in substantial overshooting of the temperature, and will give rise to the hazards associated with the maintenance of the normal temperature under conditions of decreased rate of charge.

From the study of cracking in coils equipped with density-responsive apparatus, it has further been found that a given charging stock may be cracked at a selected yield per pass over a certain operating range of temperature and times. In these circumstances, when the yield per pass is maintained constant, variations in the time and temperature of treatment reflect themselves in variations in the density at the outlet of the coil. Inasmuch as it has been found that the outlet in situ density of the synthetic crude is an indication of the heat contained therein (available for subsequent processing of the fluid in fractionating apparatus or the like), it follows that a given stock may be cracked to the same yield per pass while varying the heat contained in the synthetic crude. Thus, by utilizing the methods and means of the present invention, a control of the thermal efficiency of conversion processes is made available.

It is recognized that in the processing of hydrocarbon fluids of wide boiling range in a single conversion system, time and temperature factors cannot be maintained at values suitable for the optimum treatment of all fractions of the charging stock. For this reason it is sometimes found desirable to treat selected fractions of the charging stock in a number of coils. With such a multicoil system the individual coils may be regulated in accordance with the principles of the present invention to maintain more closely the optimum time-temperature relationships for the treatment of the selected fractions, while at the same time regulating the heat from the synthetic crudes to maintain optimum conditions in a vapor separator into which the different synthetic crudes may be discharged.

In order more clearly to disclose the nature of the present invention and the manner in which the above mentioned features may be attained, reference will hereinafter be made to the accompanying figures of the drawings, wherein:

Fig. 3a is a face view partly in section, showing the detailed structure of a suitable adjustable, segmental orifice.

Fig. 3b is a sectional side view of the adjustable, segmental orifice shown in Fig. 3a.

Fig. 5 is a co-ordinate chart which shows a graphical method of correlating the weight-rate, the segment setting of the adjustable orifice and the manifestation of such orifice, to determine the in situ density of the particular fluid flowing through such orifice.

Fig. 9 is a diagrammatic representation of an automatic apparatus for indicating and recording the fundamental conditions within a hydrocarbon flow system.

Fig. 10a is a detailed diagrammatic illustration of one form of automatic apparatus involving the use of logarithmic cams, for indicating and recording density, mean density, time, and time-temperature relation.

Fig. 10b diagrammatically illustrates a modification of the system shown in Fig. 10a wherein the apparatus is adapted for automatically indicating and recording mean density.

Figure 11A:
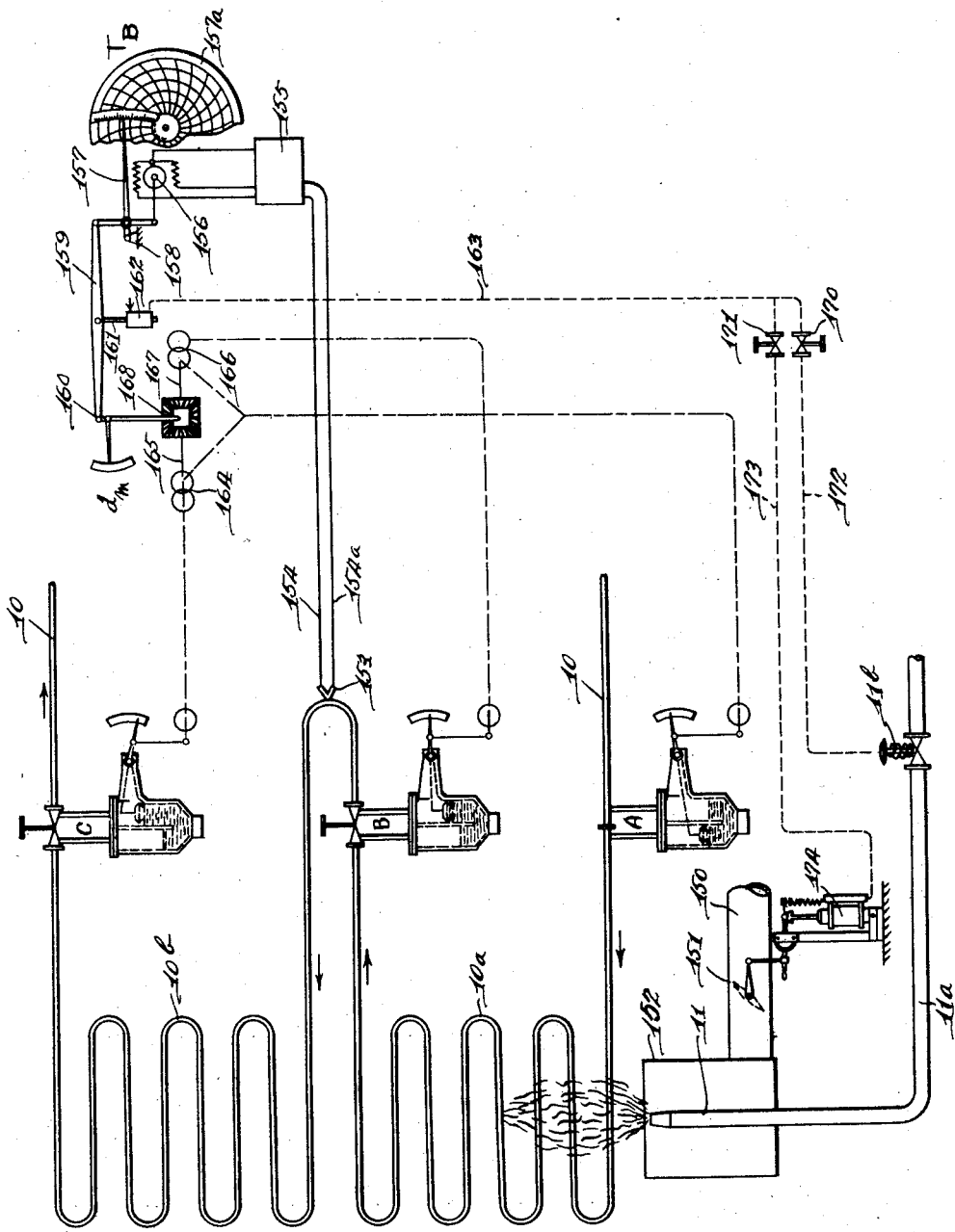

Fig. 11a is a diagrammatic illustration showing one form of apparatus for automatically controlling elements of combustion supplied to a cracking furnace, in accordance with the mean density and the temperature of the hydrocarbon at a selected point in the flow path.

Fig. 11b is a diagrammatic representation of a cracking apparatus wherein the mean density and mean temperature are utilized consecutively to control the recirculation of the flue gas around the bridge wall in a cracking furnace, and the fuel supply to such furnace.

Fig. 11c illustrates a control system somewhat similar to that in Fig. 11b, except that in Fig. 11c the system is adapted for controlling the firing, or the recirculation of the products of combustion.

Fig. 12a illustrates a system wherein the controls are adapted to regulate the back pressure on an apparatus which includes a reaction chamber.

Fig. 12b is a modification of a portion of the apparatus shown in Fig. 12a whereby the back pressure control system may be adapted to a hydrocarbon flow system wherein the reaction chamber of Fig. 12a is omitted.

Fig. 13 is a diagrammatic illustration of an arrangement of the apparatus to record continuously time of detention and to control either the charging rate or the fuel supply in accordance therewith.

Fig. 13a diagrammatically represents a cracking system provided with apparatus for continuously indicating the yield per pass for a specific charging stock, and controlling the charging rate or the fuel supply in accordance therewith.

Fig. 13b illustrates an amplification of a part of the system shown in Fig. 13a, which provides for continuously indicating yield per pass with stocks of varying characteristics, and controlling the operation in accordance therewith.

Fig. 14 illustrates the use of a density-responsive element in a system provided with a tank gauge.

Figure 15A:
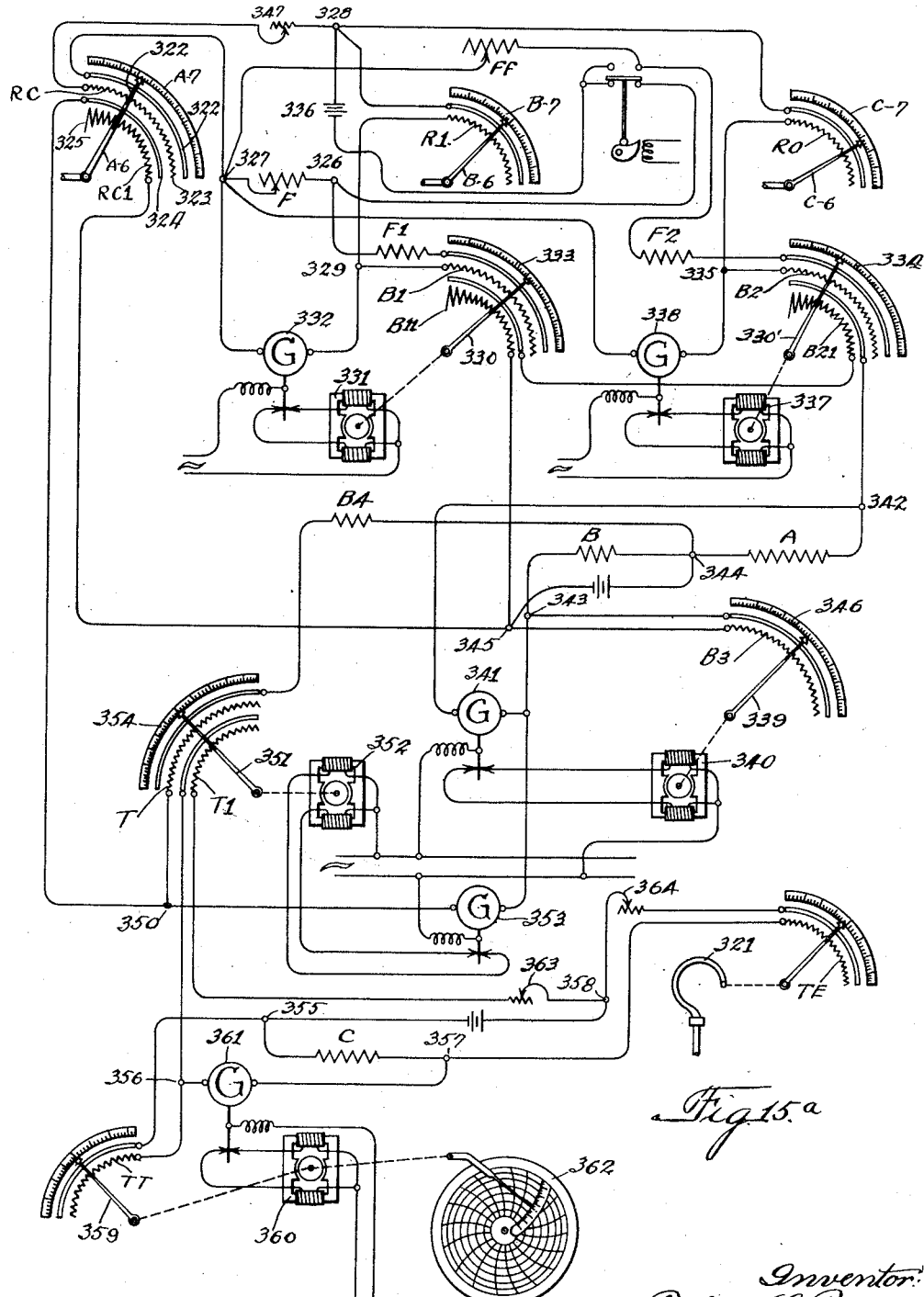

Fig. 15a is a diagrammatic illustration of another type of apparatus involving a Wheatstone bridge, for automatically correlating various control factors.

Figure 15B:
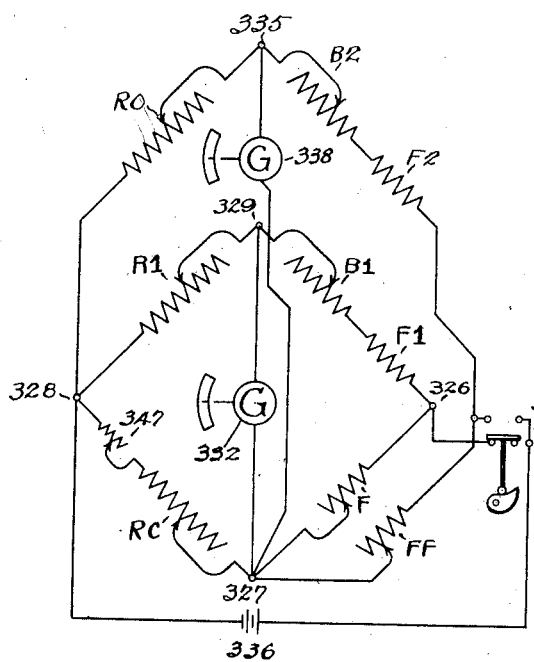
Figure 15C:
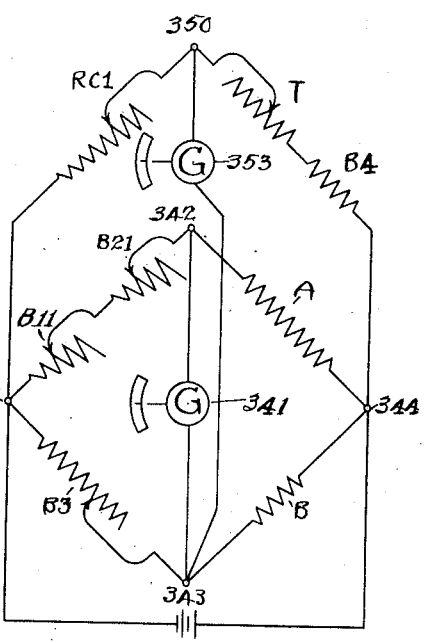
Figure 15D:
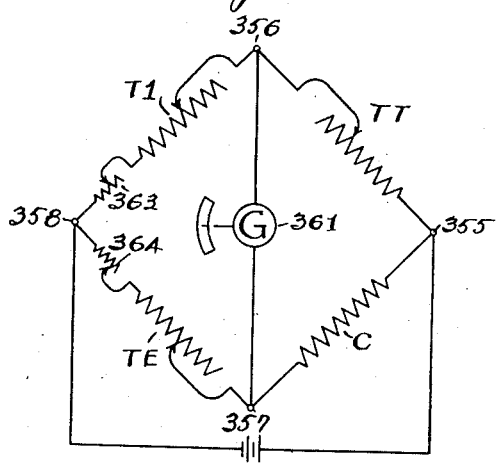

Figs. 15b, 15c, and 15d are simplified wiring diagrams of parts of the composite wiring system shown in Fig. 15a.

Fig. 16a is a diagrammatic illustration of still another form of apparatus involving the use of positive displacement meters for continuously and automatically determining and recording the density of a hydrocarbon fluid undergoing conversion.

Fig. 16b is a detailed plan view of a portion of the apparatus shown in Fig. 16a.

Figure 17:
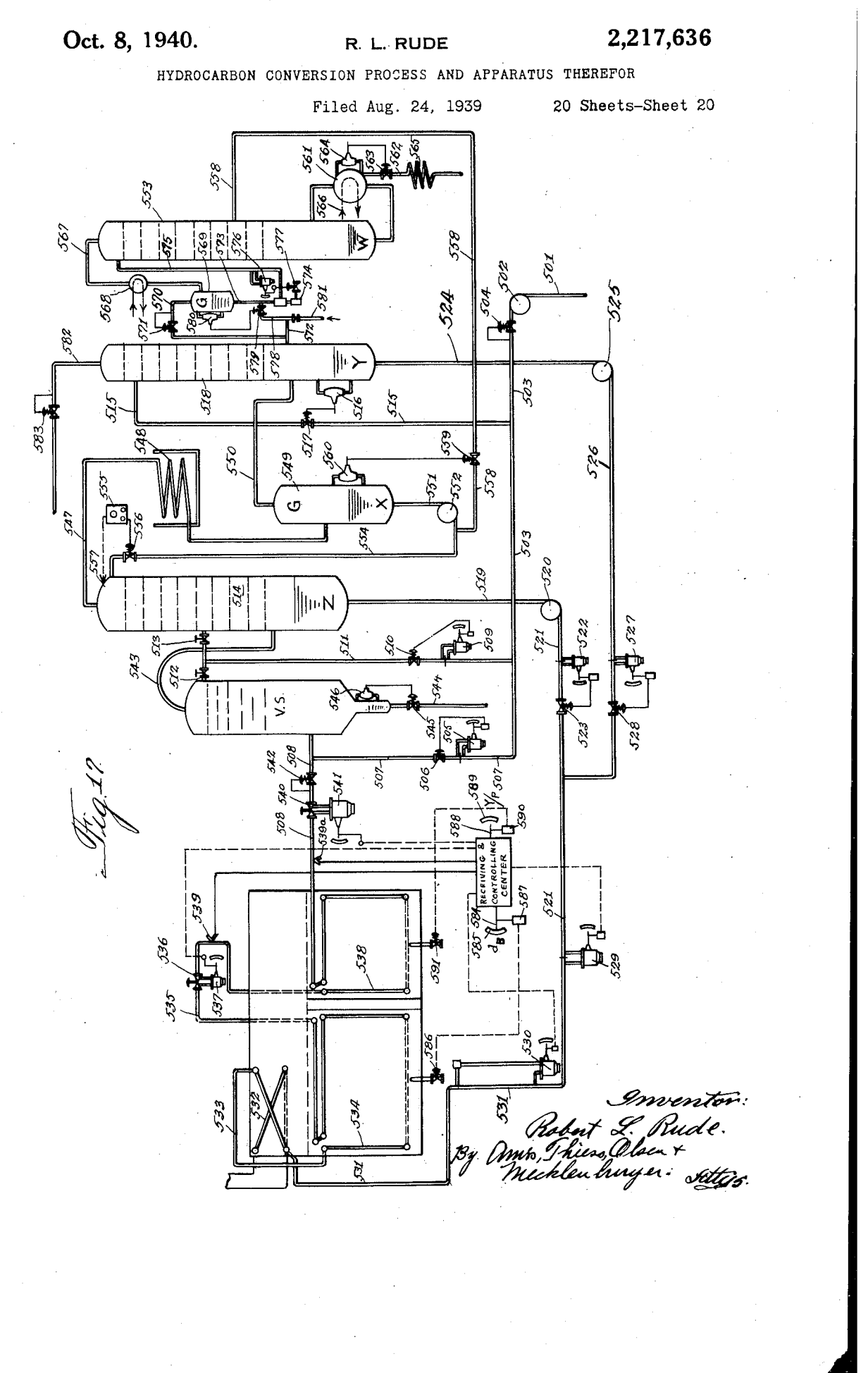

Fig. 17 is a diagram illustrative of a cracking unit adapted for recirculation of the gaseous products of conversion, and provided with automatic indicating and controlling instrumentalities in accordance with a further aspect of the present invention.

THE INADEQUACY OF SAMPLE DENSITY MEASUREMENTS

Before taking up a detailed description of the present invention, it is important at the outset to emphasize the inadequacy of what may be termed "sample gravity determinations," as a basis for solving the problem of determining the state of the fluid under the conditions prevailing in a flow system.

Figure 1:
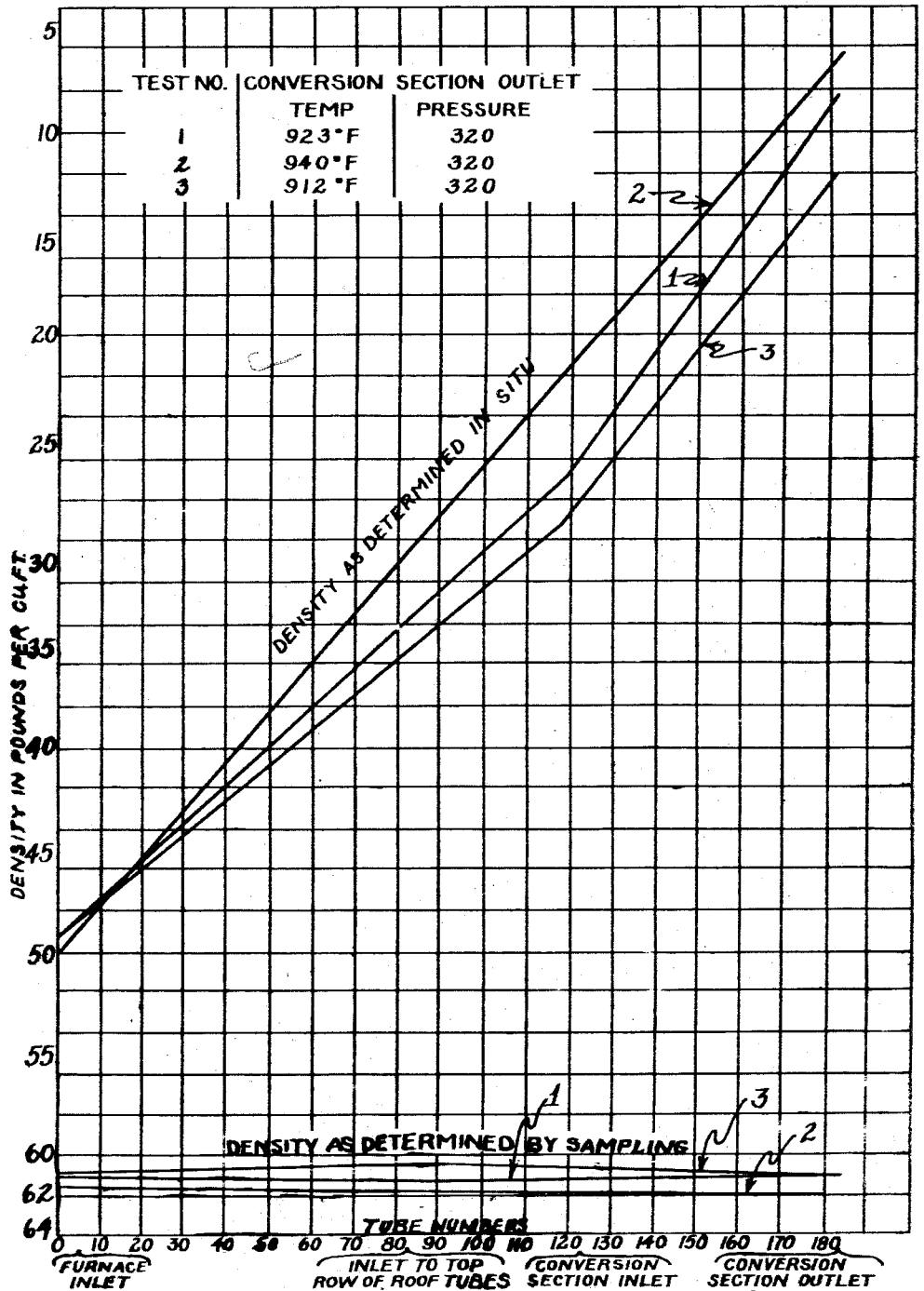
Figure 1 is a co-ordinate chart showing the density of a hydrocarbon undergoing cracking, at various points along the flow path, as determined by cold sampling methods in accordance with the prior art, and as determined in situ, in accordance with the present invention.

It is, in general, impossible to determine the state of the fluid in any selected section of a flow system (for example, in the so-called "conversion" section of a cracking coil) by making "sample gravity determinations." If sufficiently complete information were available on the pressure-volume-temperature relations of the fluid, it would be possible to ascertain the density of the fluid under flowing conditions from measurements made on a sample at or near atmospheric conditions. However, such information is in general not available for petroleum fractions, and would not in any case lead to a method for the continuous determination or control of the state of the fluid. Furthermore, cold sample determinations have been found to be so insensitive to the treatment of the fluid that they give very little operating information suitable for purposes of controlling the treatment. This is clearly evidenced by the curves of Fig. 1 which contrast densities under flowing conditions with corresponding densities from cold sampling. The three upper curves exhibit the density of a charging stock undergoing cracking as determined in accordance with the present invention under three different operating conditions (1, 2, 3); while the three lower curves exhibit the corresponding densities of the fluid when a sample is withdrawn and reduced to atmospheric conditions of temperature and pressure. The curves of Fig. 1 demonstrate clearly the impossibility of utilizing sampling methods either as a basis for ascertaining the conditions obtaining within the flow system, or as a basis for providing control of the conversion taking place therein.

DETERMINATION OF IN SITU DENSITY

The fundamental basis, in accordance with the present invention, for the determination of density, or for the indication or manifestation of density in a flow system, comprises a correlation between the weight-rate of flow and the volume rate of flow. In the case of a continuous flow path, the weight-rate of flow is the same at every point of the path, but the volume-rate of flow is, in general, variable from point to point of the path. Elements responsive to the volume-rate of flow of the fluid may have their indications correlated with weight-rate of flow (or with information equivalent thereto) to arrive at the density at selected points in the flow path. The ascertainment of weight-rate of flow itself is in principle dependent upon a knowledge of volume-rate of flow and of the density of the fluid at the point where the volume-rate is measured. Once, however, the weight-rate is available, flow-responsive devices at selected points will enable the density at those points to be ascertained. This aspect of the present invention concerns the recognition of the possibility of extending density determinations from a point in the flow system where the density has a known, accessible value (and where it is usually incorporated in the weight-rate of flow), to any other points where volume-rate of flow (or some equivalent thereof) can be measured by any conventional means.

In accordance with this aspect of the present invention, the in situ density of a flowing fluid is ascertained by inserting a flow-responsive element into the path of flow at the point where it is desired to find the density under the prevailing conditions. The indications or manifestations of the said flow-responsive element are correlated with indications or manifestations of weight-rate of flow through the element in question to arrive at an indication, manifestation, or determination of the density of the fluid at the point under consideration. If the primary element responsive to the flow of fluid consists of an orifice, the familiar hydraulic equation (in one of its many equivalent forms), $$W = 360 cfD^2 \sqrt{hd} \qquad (a)$$

enables the density $d$ (lb. per cu. ft.) to be determined when the weight-rate of throughput of fluid $W$ (lb. per hour), the coefficient of discharge $c$ of the orifice, the factor of approach $f$ of the orifice, the diameter of the equivalent orifice hole $D$ (inches), and the differential head $h$ (inches of water) across the orifice are known. From a number of methods (for example, by tank gauging, by flow-metering, by pump displacement, or the like) familiar to the art, the weight-rate $W$ of throughput may be determined. The orifice characteristics $(cfD^2)$ are known from the design of the orifice. The differential head $h$ is manifested, recorded, or the like, by the secondary element attached to the primary element. Thus the hydraulic equation can be used to arrive at the density $d$, all the other factors in the above relation being known:

$$d = \text{const.} \, W^2/h$$

In a desirable variation of the present aspect of this invention, the ascertainment of the weight-rate of throughput may be avoided by using the differential head $h_A$ at an orifice located at a point where the density $d_A$ of the fluid has a known value. In this case, where the same weight-rate of flow passes through the similar orifices A and B, $$d_B = d_A h_A / h_B \qquad (b)$$

and the density $d_B$ at any point B of the system can be obtained in terms of $d_A$, $h_A$, and the differential head $h_B$ at orifice B. For orifices of different characteristics, the equation becomes $$d_B = d_A (cfD^2)_A^2 h_A / (cfD^2)_B^2 h_B \qquad (c)$$

where $(cfD^2)_A$ refers to the charge orifice, and $(cfD^2)_B$ to the orifice where it is desired to measure density.

It should be observed that the in situ density as ascertained or made manifest in accordance with the present invention is in no way dependent upon the analysis of samples withdrawn from the flow system, or upon the determination of molecular weights, or upon a knowledge of deviations from the perfect gas laws, or upon whether or not the fluid exists as a vapor, a liquid, or a liquid-vapor mixture.

Figure 2:
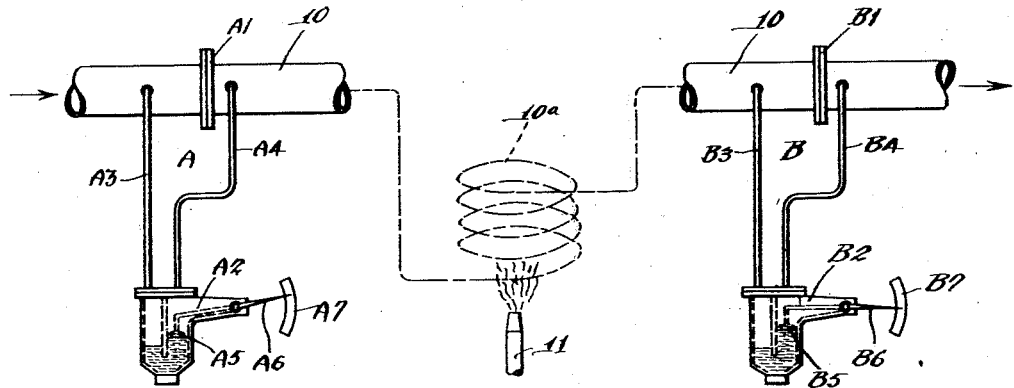
Fig. 2 is a schematic representation of a simple flow system wherein one portion of the flow path constitutes a treating section, the system being provided with means in accordance with the present invention.

For purposes of illustration, Fig. 2 shows diagrammatically a once-through flow path 10, for example, that in a tube still, in which are located flow-responsive elements A and B, one of which (A) is used to make manifest the weight-rate of throughput before conversion, such as vaporization, is effected in coil 10a, and the other (B) is used to make manifest changes in the state of the fluid as a result of the conversion.

The flow-responsive elements A and B of Fig. 2 are represented for illustrative purposes as comprising a suitable orifice (A1 or B1) connected to a differential pressure gauge (A2 or B2) by lines (A3 and A4 or B3 and B4). A suitable float (A5 or B5) actuates an indicator (A6 or B6), the position of which with reference to a scale (A7 or B7) provides an indication of the differential pressure across the orifice located in the flow path. As a matter of convenience, the flow-responsive elements will hereinafter be designated by the letters A, B, etc.

The treatment of the fluid in coil 10a can be regulated to maintain any desired relation between the manifestations of elements A and B. If desired these manifestations may moreover, be correlated to obtain an indication or determination of the density of the fluid at B in accordance with the principles set forth above. Thus, for example, $$d_B = d_A h_A / h_B$$

or $$d_B = KW^2 / h_B$$

The diagram in Fig. 2 is merely illustrative, the treatment of the fluid being effected simply by heating, and the flow-responsive elements being shown as orifice meters for the purpose of clarity.

For convenience, in the following description and in the appended claims, the term "weight-rate of flow" should be understood to include not only the actual numerical value of $W$ (for example, in pounds per hour), but also any data equivalent thereto (for example, volume-rate of flow and specific gravity of the charge, or differential head and density at the charge meter, or the like), as well as electrical, pneumatic, or mechanical manifestations, or the like, which are indicative of $W$ or functions of $W$.

ADJUSTABLE ORIFICE

To enable a wide range of density values to be handled satisfactorily, a widely applicable method is to employ adjustable orifices, such an orifice being given appropriate segment settings corresponding to various values of the coefficients $(cfD^2)$, so that the motion of the indicator or recording pen can be confined within selected limits. The way in which the segment setting is incorporated in the determination of density will be evident from Equation $c$, supra.

The construction of a suitable adjustable orifice for use in hydrocarbon conversions is shown in Figs. 3a and 3b, and is described in detail in my copending application, Serial No. 152,859, filed July 9, 1937. An orifice of this type is characterized by certain features which are dictated by the peculiar nature of the problems encountered in the conversion of petroleum hydrocarbons. Thus, for example, to prevent the deposition of coke on the primary element, means are provided for cooling the plate, the stem, and (if desired) the body of the orifice, and oil may be pumped into the pressure taps to keep them open. It was found experimentally that even under extreme conditions where a considerable amount of carbon was deliberately deposited around the orifice, the calibration at intermediate segment settings was only slightly changed. The presence of enough coke to affect the accuracy of the operation of the element may conveniently be detected by testing the consistency of the density values obtained with a number of different segment settings, when operating under a given set of conditions.

DETERMINATION OF THE MEAN IN SITU DENSITY AND OF TIME OF TREATMENT

Figure 4:
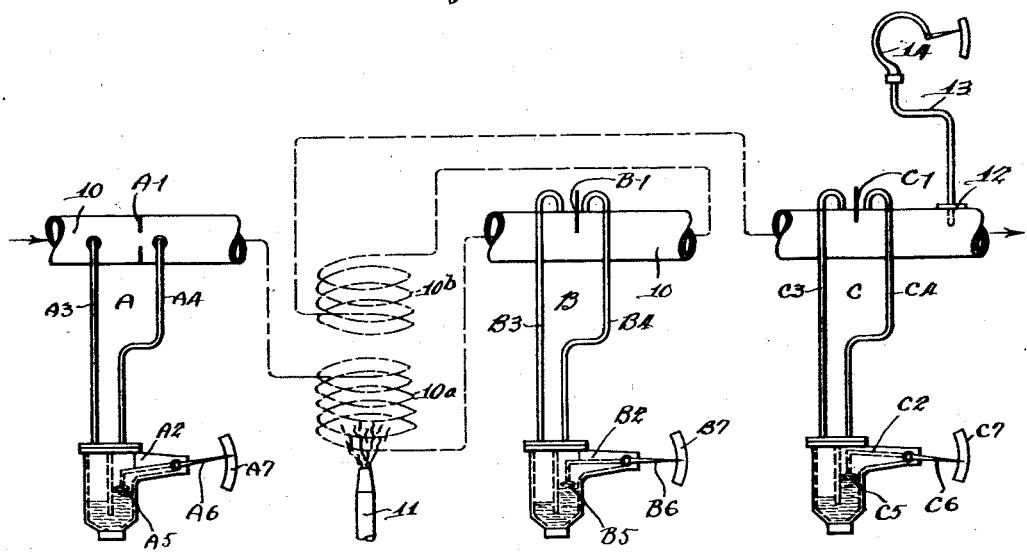
Fig. 4 is a schematic showing somewhat similar to Fig. 2 except that the flow system of Fig. 4 is provided with two treating sections, this system likewise being provided with means in accordance with the present invention.

Referring now to Fig. 4, the hydrocarbon enters the system through the inlet flow-responsive element A, and after passing through the first heating section 10a, flows through the second element B, and then enters a second heating section 10b, whence it passes through a third flow-responsive element C. In this illustrative example, the flow system may be considered to be representative of the once-through flow path of a petroleum cracking unit, wherein the first section 10a may be designated as the heating section, while the second section 10b is usually called the conversion section, although the use of these terms is not to be taken as implying that the cracking reaction is necessarily confined to the conversion section. Even in the case of furnaces which do not have separately-fired sections, it is convenient to consider the flow path as comprising two zones which may be designated as the heating section and the conversion section respectively. The density at B and the density at C may be determined in accordance with the method disclosed (supra), and the arithmetic mean density for the conversion section then may be obtained.

In this procedure, the mean density is determined as a matter of convenience from the average of the density of the fluid at the inlet and at the outlet of a selected section or zone of the flow system. In some instances, it may be feasible to install a flow-responsive element at a point in the flow path where the density of the fluid is substantially representative of the mean density for the zone in question. The actual "mean density point" in the flow system may be determined, for example, by inserting flow-responsive elements at intervals along the flow path in the section under investigation, a sufficient number of such elements (which need not form a permanent part of the installation) being used to enable a plot of density, under constant operating conditions, against position in the system.

However, the actual mean density point will, in general, shift with variations in operating conditions, and the determination of the arithmetic mean density is to be preferred for a number of reasons. In the first place, for control purposes and for the determination of time (vide infra), the arithmetic mean density is sufficiently representative of the average state of the fluid in the selected section under all conditions likely to be encountered in practical operation. In the second place, the two flow-responsive elements employed for a determination of the arithmetic mean density afford a more flexible basis for control than would a single flow-responsive element located at a mean density point. The control features involving the arithmetic mean density will be discussed in greater detail hereinafter.

If, in any given instance, it is found advantageous to modify the arithmetic mean density to allow for any significant corrections which may be suggested by a more extensive exploration of the system, such modification may be made readily. Thus, for example, in designing instruments for the determination of mean density and time, provision may be made for imposing the desired modification by means of adjustable resistance values, adjustable cams, or the like, as hereinafter indicated.

In accordance with a further aspect of the present invention, the in situ density of the flowing hydrocarbon stream undergoing change provides a means for determining the time of treatment. This in turn permits the control of the hydrocarbon process to maintain the optimum conditions for the particular transformation which it is desired to effect. The time $t$ of detention of the hydrocarbon fluid within a zone of known volume V may be determined from the mean density $d_m$ of the fluid in that zone, and the weight-rate of input W in accordance with the following relation:

$$t = d_m V / W \quad (d)$$

In this relation, if V is in cubic feet, W is in pounds per minute, and $d_m$ in pounds per cubic foot, the time $t$ will be given in minutes.

IN SITU DENSITY AS A MEASURE OF THE TOTAL HEAT

In accordance with still another aspect of the invention, it has been found that the in situ density of the hydrocarbon undergoing conversion provides a measure of the total heat of the fluid at points where the density is determined. The relationship of in situ density and total heat may be illustrated by the following example, wherein the density at the outlet of the conversion section of a cracking coil is correlated with the heat in the synthetic crude. Three tests (A, B, and C) were conducted with different coil outlet pressures, while maintaining as closely as possible the same rate of furnace charge, the same quality of charging stock, and (by varying the amount of fuel fired) the same yield per pass. The heat absorbed per pound of charge is given in Table 1, together with the corresponding outlet density and outlet pressure.

TABLE 1

Heat absorbed per pound of charge and outlet density and pressure

| Test No. | Yield per pass (percent by volume) | Outlet pressure (lb. per sq. in.) | Outlet density (lb. per cu. ft.) | B. t. u. per lb. of furnace charge |
|---|---|---|---|---|
| A | 12.9 | 330 | 5.9 | 369 |
| B | 12.5 | 600 | 18.5 | 346 |
| C | 12.9 | 175 | 2.9 | 396 |

These observations show the extent to which the heat in the synthetic crude can be varied to maintain, for example, prescribed conditions in the vapor separator. They also indicate the possibility of using the density at the outlet of the conversion section as a measure or index of the heat available in the synthetic crude for such a purpose. It may be noted that the heat can be varied within fairly wide limits while maintaining the same rate of conversion.

The relation between the in situ density and the total heat of a hydrocarbon fluid provides a convenient basis for controlling the burden or duty upon equipment into which the hydrocarbon is discharged after heat treatment. Thus, for example, again referring to Figs. 2 and 4, the flow systems shown therein may be considered as diagrammatic representations either of a crude pipe still (Fig. 2) or of a cracking coil (Fig. 4). The flow systems discharge into a suitable fractionating system (not shown). In order to control the fractionation in such system, it is desirable to regulate the rate at which heat is discharged therein. Accordingly, there may be installed in the transfer line a suitable flow-responsive element such as the outlet orifice meter B of Fig. 2, or C of Fig. 4. By regulating the fires under the coil in order to maintain the outlet density at a selected value, the load or duty on the fractionating equipment may be maintained at a satisfactory level, so that the desired thermal efficiency of the equipment is attained. Further illustrations of this aspect of the invention are discussed hereinbelow, and additional details are disclosed in my copending application, Serial No. 232,563, filed September 30, 1938.

RELATION OF YIELD PER PASS TO TIME, TEMPERATURE, AND STOCK FACTOR

Tests, some of which have been already cited in connection with the heat in the synthetic crude, were conducted at approximately the same yield per pass and with as nearly as possible the same quality of charging stock, but at different times and temperatures of treatment. Previous literature dealing with rates of cracking suggests that a time-temperature index may be constructed to enable a correlation of yield per pass with time and temperature. Tests conducted with charging stocks of different qualities made it evident that the observations as a whole could not be correlated on such a simple basis, and it was found necessary to characterize the stocks in some way which would indicate their varying behaviour under cracking conditions.

The experiments performed appear to show that the quality of the stock, insofar as it affects cracking, is essentially a function of molecular weight and hydrogen-carbon ratio. As a measure of the former (i. e., molecular weight) the average boiling point may be used, if desired. Likewise, as an indication of the hydrogen-carbon ratio, the iodine number of the charging stock may be employed. (For a more detailed discussion of such factors, reference may be had to my copending application Serial No. 152,860, filed July 9, 1937.) However, for the purpose of the present disclosure, it will be convenient to select the A. P. I. gravity and the aniline number as suitable indicia of the molecular weight and hydrocarbon ratio, respectively, these quantities being determined sufficiently easily and rapidly to provide information regarding stock character as frequently as is necessary in commercial operation. It should, of course, be understood that, for the purposes of the present invention, any suitable means for characterizing the charging stock—such as the specific gravity, the A. P. I. gravity, the aniline number, the iodine number, the refractory index, and the like—may be used where desired, all such variations and modifications being within the contemplation of the invention. However, for the reasons pointed out above, this aspect of the invention may conveniently be exemplified by reference to the specific gravity and the aniline number, it being understood that this is done solely for purposes of example. Moreover, the experimental data were correlated using as simple a function of these two variables as possible, and this function will be called hereinafter the "stock factor".

The particular function of gravity $G$ and aniline number $A$ which was introduced as a stock factor is:

$$AG/1000$$

and one of the empirical yield per pass relations which was obtained is:

$$P = (AG/1000)\, Ct10^{(T-T_0)/f} \qquad (e)$$

where $P$ is the weight per cent gasoline (of definite specification) plus gas per pass, $t$ is the time, $T$ the temperature, and $C$, $T_0$, and $f$ adjustable constants.

On calculating the yield per pass for the different times, temperatures, and stock factors occurring in the various tests, it was found that closer agreement with the observed yields could be obtained by a further correction. The correction found necessary to fit the observed data was incorporated in the above yield per pass relation which now reads:

$$P = (AG/1000)\, Ct10^{(T-T_0)/f}(1+c/d) \qquad (f)$$

where $d$ is the density at the outlet of the conversion section, and $c$ is a constant. When $t$ is expressed in minutes, $T$ in degrees Fahrenheit, $d$ in pounds per cubic foot, and $P$ in per cent by weight of 380–EP gasoline plus gas, the following values for the constants in this formula were found for the unit involved in these tests:

$$C = 0.92, \quad T_0 = 850, \quad f = 73, \quad c = 0.68$$

An appreciation of the nature of an empirical correlation of observed data will make it evident that it is not necessary that $t$ and $T$ should be the actual values of the time of treatment and temperature of treatment, but need be only functions of these values. However, the mean time and mean temperature for the conversion section, as directly recorded, were found entirely adequate to provide a yield per pass relation such as $(f)$ for control purposes.

In certain instances a more precise characterization of charging stocks may be found desirable, for example, when processing stocks derived from widely different types of crude. Thus a factor or factors in addition to, or in lieu of, gravity and aniline number may be found necessary to express the varying tendency of stocks to polymerize under certain temperature conditions, such polymerization affecting, in particular, the thermal stability of recycle stocks. However, the methods of approach to stock characterization described herein are sufficiently general to enable any subsequent modification and extension of the stock factor correction to be incorporated readily in a yield per pass relation. By proceeding in this way one deals with observed values of variables, and is not dependent in any way on prevailing theory.

In Table 2 are tabulated the observed values of the variables involved in this series of tests, and, in the last column, the yields calculated in accordance with Equation $(f)$.

TABLE 2
Summary of experimental data used in construction of yield per pass relation Yield per pass in weight percent 380–EP gasoline plus gas

| Gravity G (deg. A.P.I.) | Aniline No. A (deg. F.) | Stock factor $\frac{AG}{1000}$ | Temperature (deg. F.) | Outlet density $d$ (lb./cu. ft.) | Time $t$ (minutes) | Yield per pass observed (percent) | Yield per pass, calculated from (f) (percent) |
|---|---|---|---|---|---|---|---|
| 19.6 | 97 | 1.90 | 914 | 5.9 | 0.84 | 12.6 | 12.5 |
| 18.0 | 95 | 1.71 | 897 | 18.5 | 1.66 | 11.9 | 11.9 |
| 19.2 | 100 | 1.92 | 923 | 3.0 | 0.53 | 12.5 | 11.5 |
| 20.6 | 85 | 1.75 | 905 | 6.4 | 0.87 | 8.4 | 8.8 |
| 15.4 | 61 | 0.94 | 918 | 15.3 | 1.21 | 9.0 | 9.3 |
| 17.0 | 79 | 1.34 | 924 | 1.8 | 0.53 | 8.4 | 9.3 |
| 12.2 | 57 | 0.70 | 900 | 22.5 | 1.77 | 7.1 | 5.7 |
| 15.5 | 83 | 1.29 | 918 | 13.8 | 1.24 | 12.6 | 13.1 |
| 18.9 | 96 | 1.81 | 913 | 9.6 | 1.03 | 11.5 | 13.4 |
| 18.6 | 84 | 1.56 | 928 | 9.1 | 0.97 | 14.2 | 17.6 |
| 11.9 | 70 | 0.83 | 934 | 10.5 | 0.95 | 11.8 | 10.9 |
| 9.8 | 70 | 0.69 | 928 | 17.3 | 1.40 | 10.8 | 10.8 |
| 18.0 | 82 | 1.48 | 927 | 7.0 | 1.00 | 16.0 | 17.0 |
| 12.5 | 80 | 1.00 | 914 | 10.3 | 1.38 | 11.5 | 10.2 |
| 15.5 | 93 | 1.44 | 911 | 9.2 | 1.30 | 13.0 | 12.8 |
| 12.0 | 65 | 0.78 | 929 | 11.0 | 1.35 | 11.5 | 12.4 |
| 14.3 | 70 | 1.00 | 907 | 11.7 | 1.50 | 7.8 | 8.8 |

The range of operating conditions which is covered in the yield per pass relation is rather wider than ordinarily would be encountered in the operation of a single cracking unit. The conditions, however, are restricted to the possible working range of one unit, and there is no reason to suppose that the same constants will apply to a relation obtained for another unit operating over different ranges of temperatures and times. The procedure to be followed in constructing a yield per pass relation over any desired range of operating conditions will be essentially as has been described. It may be noted that the yield per pass relation given hereinbefore is a representative member of a large class of equivalent empirical relations, any one of which will express equally well the tabulated results.

In the foregoing discussion, the principles of obtaining a suitable empirical relation for control from degree of conversion have been specifically illustrated with reference to the cracking reaction. It should be apparent, however, to anyone skilled in the art that similar relations may be constructed empirically for any other type of conversion process.

PROCESSING FROM DENSITY-RESPONSIVE ELEMENTS—MANUAL CONTROL

In accordance with a further aspect of the present invention, it has been found that the installation of flow-responsive elements at selected points in the flow path supplies the operator with indications valuable for control, thereby making it possible to obtain improved processing results. This is due to the fact that a flow-responsive element used in this manner is not only sensitive to variations in temperature, pressure, rate of charge and stock characteristics, but reflects the effect of a change of any one of these on the other variables, and thereby serves to correlate or give a composite expression for the total effect of the change in any one of the variables. This has been discussed previously in this disclosure in connection with illustrating the utilization of density-responsive elements in effecting control of the fuel fired where the compensating effect of these variables is pointed out.

It has been the practice in the cracking processes of the prior art to select and maintain constant conditions of pressure and charging rate, and to determine empirically the temperature required by a given charging stock to effect a selected degree of conversion. The process of the present invention is characterized in part by the utilization of the density-responsive elements to supplement prior art control methods. Moreover, the provision of a single element responsive to the combined effect of the processing variables enables the processing of hydrocarbon fluids to be effected at a more constant optimum degree of conversion than heretofore attainable. In accordance with this aspect of the invention, it is not essential to have any knowledge of the actual density of the fluid passing through the density-responsive elements. The process is regulated substantially to maintain a predetermined relationship between the manifestations of the density-responsive element or elements and manifestations of other selected operating variables.

In addition to these desirable features of a process regulated from flow-responsive elements, it has been discovered that such elements make manifest the total heat absorbed by the fluid. As an illustration of this feature, in a unit operating in accordance with the principles of the present invention, which unit was being operated to produce asphalt of a specified penetration, the cracking coil was controlled at a constant rate of charge, a constant pressure at the outlet, and a constant transfer line temperature. It was observed that, with operating conditions substantially constant as far as temperature, pressure, and rate of charge were concerned, the penetration of the asphalt varied over a large range instead of being confined between the specified limits. However, on regulating the firing to maintain a constant reading of the density-responsive element at a selected point of the cracking coil, while permitting the outlet temperature to vary, it was found that the penetration of the asphalt could be maintained within the specified range. The reason for these improved results was due to the maintenance of a constant heat content of the synthetic crude discharged into the vapor separator, resulting in a constant degree of reduction of the residue leaving the base of the vapor separator, in spite of minor variations in the quality of the furnace charge. For purposes of clarification, it should be understood that the operator utilized only the indication of the density-responsive element, and that he had no knowledge of the numerical values of density. He was concerned only in maintaining the indication constant, permitting temperature to vary as required.

In actual operation of the process of the present invention it may be found desirable in some instances to construct tables, charts, or graphs to facilitate the correlation of the data to be utilized for processing, and to exhibit the relationships between the manifestations of the flow-responsive elements and other operating variables. These devices permit, if desired, the conversion of the manifestations of the flow-responsive elements into numerical values of density, time, yield per pass, or the like. For purposes of illustration, the relationships of these manifestations to density, time, etc., are exhibited graphically in Figs. 5, 6 and 7.

A chart such as the one shown in Fig. 5 may be constructed for the flow-responsive element located at the point selected as the inlet to the conversion section of a cracking coil. The manifestations of the flow-responsive element are tabulated in the actual meter readings exhibited by the secondary element, and the chart shows the relation between charging rate (weight-rate of input in lb. per sec.), segment setting of the adjustable orifice (inches), in situ density of the fluid (lb. per cu. ft.), and the meter reading (from the chart attached to the secondary element). A typical use of the chart is shown by following the dotted line drawn thereon. Thus, with a weight-rate of input of about 21 lb./sec., orifice segment setting 1.4", and meter reading 64, the in situ density of the fluid flowing through the orifice is about 7.3 lb./cu. ft.

Figure 6:
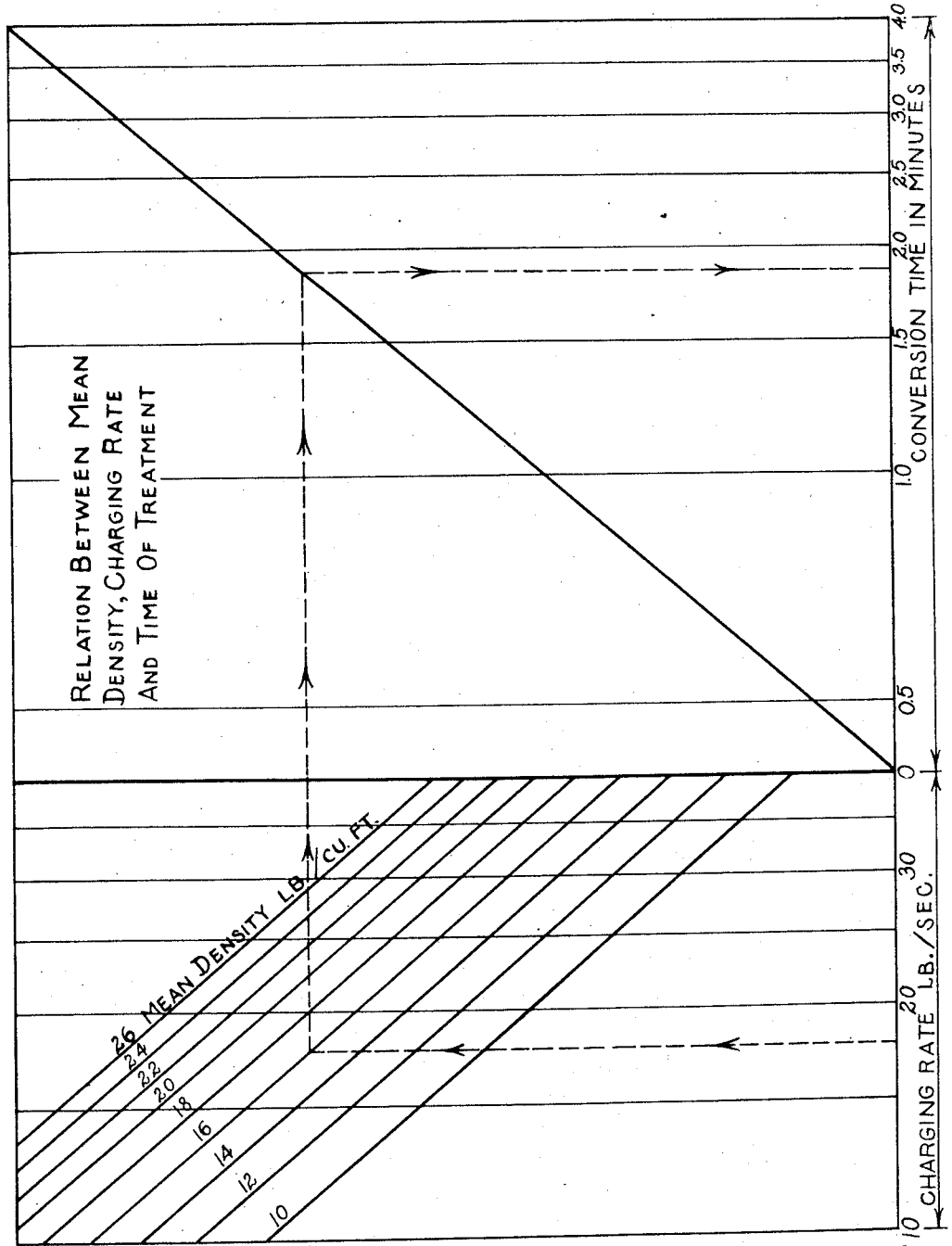
Fig. 6 is a co-ordinate chart showing a graphical method of correlating the mean in situ density of the fluid and the weight-rate of flow, to determine the time of detention or treatment of such fluid.

Fig. 6 represents graphically the relation between the weight-rate of charge, the mean density, and time of detention in the conversion section of the same cracking coil. This chart may likewise be used in the manner suggested by the dotted line. Thus, for a charging rate of 18 lb./sec., a mean density of 16 lb./cu. ft., the time of detention is seen to be about 1.8 minutes.

Figure 7:
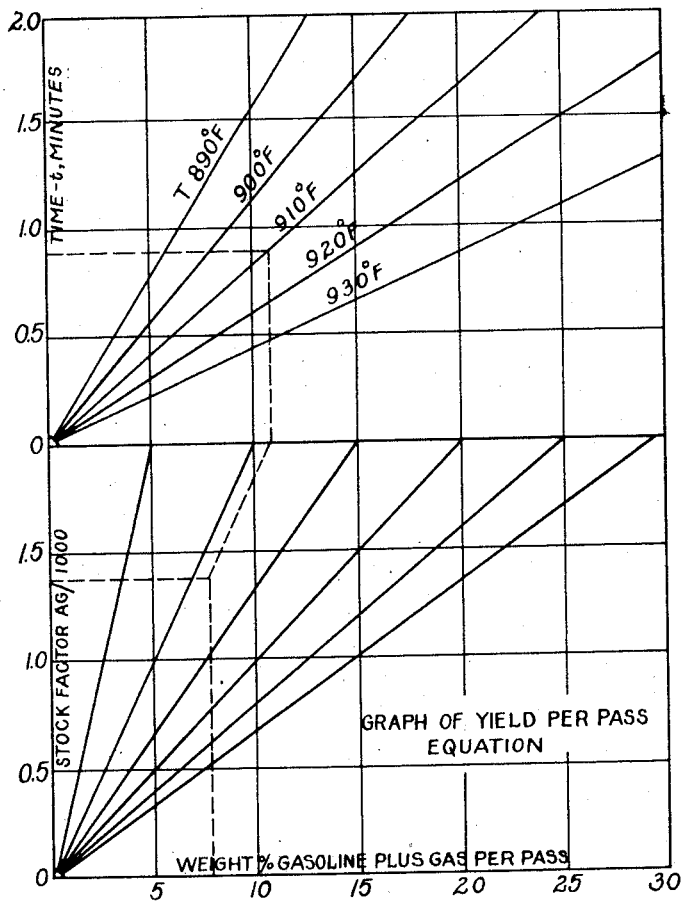
Fig. 7 is a co-ordinate chart graphically representing the relation between time, temperature, stock factor, and yield per pass or degree of conversion of a hydrocarbon undergoing cracking.

Fig. 7 illustrates graphically the relation, corresponding to (e) supra, between time of treatment, temperature, stock character, and yield per pass for the given cracking unit. Thus for example, if the stock being charged to the unit has a stock factor of about 1.4, the temperature of treatment is 910° F. and the time of treatment 0.9 minute in the conversion section, then the yield per pass is about 7.5%.

Figs. 5, 6 and 7 illustrate a possible method of determining numerical values of in situ density, time, and yield per pass, from the values of charging rate, temperature, stock factor, and meter manifestations (as given by segment setting and meter reading). It is evident that graphs of this type may be constructed with arbitrary scales to facilitate the correlation of operating conditions with meter manifestations, and that it is by no means necessary to ascertain actual numerical values. It will thus be apparent in the process of the present invention, that the operating variables of temperature, pressure, rate of charge and stock characteristics can be correlated in their effect on the factors utilized in obtaining and controlling the desired optimum results of the process. The operating variables may be expressed in terms of numerical values of time, temperature, and stock factor, as correlated with yield per pass. For a constant rate of charge and quality of stock it will be apparent that changes in operating pressure will affect the time of treatment for the same temperature, thereby resulting in a change in the degree of conversion. Through the utilization of graphs empirically constructed for a selected processing unit, it is possible to control the rate of firing, or any of the other processing variables, from the relationships of manifestations of flow-responsive elements to manifestations of any selected operating variables.

Figure 8:
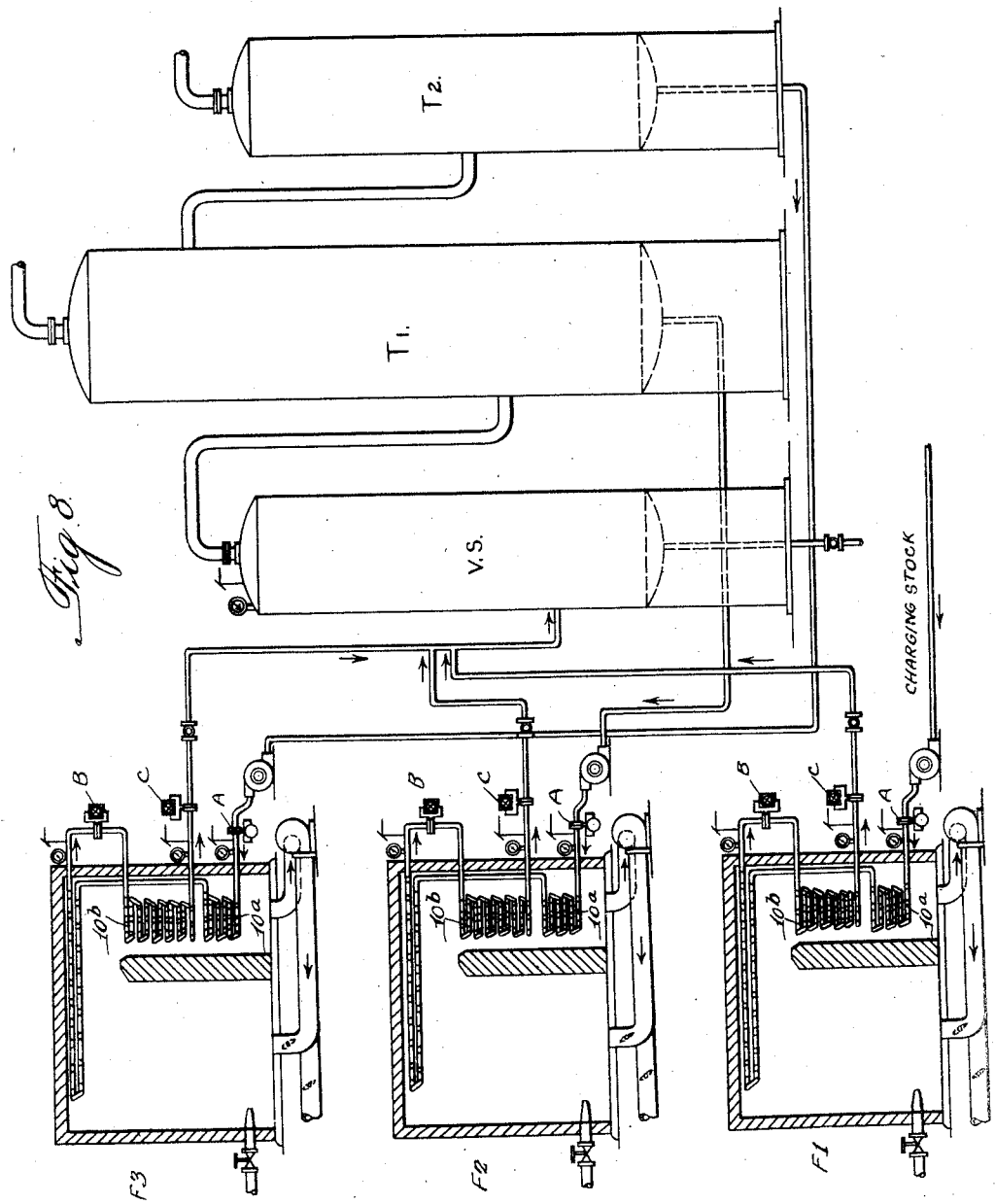
Fig. 8 is a schematic showing of a petroleum-cracking apparatus comprising three independent flow paths which discharge into a single vapor-separating apparatus.

The application of the above control method is of particular value in operating a multi-coil cracking unit such as that diagrammatically shown in Fig. 8, since it enables the operator to regulate the individual coils to maintain optimum conditions in each, despite the combining of the products therefrom into a single zone.

Fig. 8 illustrates three furnaces F1, F2 and F3 arranged in a battery, the synthetic crudes from all of said furnaces being combined in a single vapor separator V. S. Coil 10a in lowermost furnace F1 is illustrated as charged with stock such as topped crude, while the charge for furnace F2 is taken from the bottom of the first fractionating tower T1, and that for furnace F3 comprises the material gathered in tower T2 as a result of a side-cut from tower T1. Moreover, as indicated, flow-responsive devices A, B, and C are positioned along the flow path in each of the individual coils.

At charge meter A of furnace F1 the weight-rate of input may be determined in the manner previously described. After passing through the heating section 10a, consisting of tubes positioned in the convection bank and radiant heat tubes positioned on the roof of the furnace, the oil passes through flow-responsive element B corresponding to B in Fig. 4, and comprising a primary element such as the adjustable orifice shown in Figs. 3a and 3b. The fluid, after passing through B, enters 10b, wherein a substantial portion of the conversion of the hydrocarbon fluid into a synthetic crude is effected. The fluid leaving the conversion section passes through a third flow-responsive element C, corresponding in design to flow-responsive element B.

Assume now that the operator is provided with a set of charts (Figs. 5, 6 and 7) constructed for each of the coils of the unit shown in Fig. 8. With a charging stock having a given stock factor, he desires to operate the unit at selected yields per pass for the individual coils. By reference to Fig. 7 the operator determines the charging rate, time and temperature which may be employed in the cracking furnace F1, in order to attain the selected degree of conversion. Thereafter, by reference to Fig. 6, the operator determines the corresponding mean density and adjusts, by reference to Fig. 5, the elements of combustion, the back-pressure, the rate of flue gas recirculation, or the like, in order to obtain and maintain suitable meter manifestations compatible with the desired conditions. Similarly furnaces F2 and F3 may be operated to maintain meter manifestations compatible with optimum operating conditions for the particular charging stocks in question.

It will be apparent to those skilled in the art, that the method and means of this invention, applied to the control of a multi-coil unit, permit the independent regulation of each coil for maintenance of optimum conditions therein. Furthermore, the means provided enable the essential factors of time, temperature, and stock characteristics to be made manifest and utilized in the control of each coil, in spite of the combination of the synthetic crudes in a single vapor separating apparatus. When such a unit is operated in accordance with the prior art, the overall results of cracking provide no indication of whether undercracking or overcracking may be occurring in any given coil. The present invention, on the other hand, renders the conditions in the individual coils continuously manifest. Accordingly, by means of my invention, the thermal efficiency and operating economy of the unit as a whole may be improved, and thus the unit may be readily and safely operated more closely to conditions permitting the attainment of the optimum yields of desired products.

In the foregoing description, manual methods of carrying out the process of the present invention have been described. In actual commercial installations it may be desirable to practice the the invention automatically. Accordingly, it will be appropriate at this point to describe various automatic system which may be utilized where it is desired continuously and automatically to record the various fundamental conditions (for example, density, mean density, time, yield per pass, or the like), or to regulate the treatment therefrom, or both.

PROCESSING FROM DENSITY-RESPONSIVE ELEMENTS—
AUTOMATIC METHODS

The general features of one form of automatic system are shown in Fig. 9. As illustrated in this figure, the fluid after passing the orifice A—1, enters a heating section 10a having regulating means 50 and 50a. The fluid then passes the orifice B—1 and enters a second heating section 10b wherein the heating is regulated by a control device 51 and 51a.

The values $h_A$ and $h_B$ are applied to a ratio-performing mechanism 52, and the values $h_A$ and $h_C$ are applied to a ratio-performing mechanism 53. The resultant value of density of the fluid at the orifice B—1 and that of the fluid at the orifice C—1 are applied to an averaging mechanism 54 which indicates by the position of the pointer 55 relative to the index 56, the value of mean density of the fluid between B—1 and C—1. Mean density and $h_A$ are then applied to a ratio-performing mechanism 57 which indicates a resultant in terms of time, by the position of a pointer 58 relative to an index 59.

In the operation of such a unit, it may be desirable to determine a suitable time-temperature relationship adequate for the control of the conversion taking place in section 10b. To determine the temperature, the bulb 60 of a gas-filled thermometer system is located in heating system 10b, this bulb being connected by capillary 61 to a Bourdon tube 62 whose free end positions a pointer 62a to indicate, on the index 62b, the temperature at the bulb location.

The temperature-responsive means 62 and the time-indicating means 58 may act through a suitable mechanism 63 to move an indicator 64 relative to an index 65 to indicate a predetermined time-temperature relation for the fluid passing through the heating section 10b.

The control means 50 and 50a for section 10a may be actuated in accordance with the density of the fluid passing orifice B—1, through the agency of pilot valve 52a. The control mechanisms 51 and 51a of the heating section 10b may be positioned if desired in accordance with mean density, time, or time-temperature relationship. To accomplish this, air pilot valves 66, 67, and 68 are provided and are positioned respectively by the indicators 55, 58 and 64 for controlling a pressure-transmitting fluid (for example, air) which is selectively made effective upon the control mechanism 51a by means of the valves 69.

Alternatively, the air loading pressure from the pilot valves 66, 67, and 68 may be selectively made effective upon other control means (not shown) by closing the valves 69 leading to the heating element controller 51a, and opening hand valves 70 in the by-pass pressure line 71, which may be connected to any other fluid-actuated control mechanism (not shown), in order to regulate other operating conditions, for example, the back pressure, charging rate, etc.

The air pilot valves 66, 67, and 68 may be of known type wherein axial movement of a pilot stem relative to fixed ports controls the pressure of a control fluid such as air at the outlet of the assembly. A suitable pilot valve for this purpose is shown for example in United States Letters Patent to Clarence Johnson, No. 2,054,464.

One form of automatic system diagrammatically illustrated in Fig. 9 is shown in Fig. 10a wherein the ratio-performing mechanisms involve the use of logarithmic cams.

It will be apparent that if the ratio operation is performed logarithmically, the result is attained in algebraic addition, which may be mechanically performed by means of self-synchronous motors.

The self-synchronous generators for transmission of position are indicated at 80, 80A, 81, 82, 83, 84, and 85, while the self-synchronous receiving motors are indicated at 86, 87, 88, 89—90, 91—92, 93—94, 95, and 96. The transmitting generator in each case is operated at a suitable angular rotation through the angular positioning of the rotor. The stator is in each case provided with a 3-phase winding. The field windings of each transmitting generator are energized from a suitable source of alternating current supply.

The operation of self-synchronous systems of this general character for the transmission of angular movement is well known. Voltages are induced in the 3-phase stator windings of the transmitter or receiver by the single phase field winding on the associated rotor. When the rotor of one of the transmitters is moved from a predetermined position with respect to its stator, a change is effected in induced voltage in the armature winding and the rotor of the receiving motor assumes a position of equilibrium relative to the transmitting generator, wherein the induced voltages in the 3-phase windings are equal and opposite, and consequently no current is set up in the armature winding. If the rotor of one of the generators is turned and held in a new position the voltage is no longer counterbalanced, whereby equalizing currents are caused to flow in the armature windings which exert a torque on the rotor of the receiving motor, causing it to take up a position corresponding to the position of the transmitting generator.

The receiving motors 86, 87, 88 are individually positioned in synchronism with the transmitting generators 80, 81, 82. Between the indicator arm A—6 and the transmitting generator 80, cam 97 is interposed having a rise proportional to the logarithm of its angular motion, to the end that the receiving motor 86 and the recording indicator 98 positioned thereby assume a position corresponding to log $h_A$. Similarly, the indicator arm 99 is positioned by the receiving motor 87 in accordance with the value of log $h_B$, and the indicator 100 is positioned in accordance with the value of log $h_C$.

Actually the design is such that the transmitting generator 80 (positioned in accordance with log $h_A$) attains maximum desired rotation with from 10–100% full float travel. No motion of the generator 80 occurs when the float of the flow-responsive element A moves over 0–10% of its travel range. This because, as a practical matter, it is impossible to have a logarithmic cam start at zero; also because the logarithmic characteristics are such that there would be as much cam-rise for 1% to 10% of float rise as for 10% to 100% float rise. Thus the cam 97, and the similar cams of the meters B and C are made of practical size and proportion by sacrificing only the first 10% of the float travel of the flow-responsive elements and with the realization that the operation need not normally be below 10% of full float travel, since advantage may be taken of the adjustment of orifice segment settings.

In addition to indicating and recording upon the record chart 101 the values of the logarithm of the differential pressures at the three orifices, the movement of the transmitting generators 80, 81, 82 is utilized through the agency of differential self-synchronous devices algebraically to add the value of the log $h$ for the different orifices and thus accomplish the ratio operation. Angular movement imparted mechanically to the rotors of the transmitting generators 80, 81 will result in an angular positioning of the rotor of the receiving motor 89—90. Similar action occurs between the transmitting generators 80, 82 and the receiving motor 91—92; and between the transmitting generators 80A, 83, and the receiving motor 93—94.

The receiving motors 89—90, 91—92, and 93—94 have 3-phase rotor windings and 3-phase stator windings and are commonly known as differential, self-synchronous motors, for in each case they are responsive to two of the transmitting generators and assume a rotor position corresponding to the differential effect from the two related transmitters. For example, the receiving motor 89—90 has its rotor positioned responsive to a differential between the position of the rotor 80 and that of the rotor 81, or according to log $h_A$ — log $h_B$ or log $h_A/h_B$, thus performing the ratio operation.

Correspondingly the receiving motor 91—92 has its rotor positioned responsive to a differential between the position of the rotor 80 and that of the rotor 82, thus performing the mathematical operation:

$$\log \frac{h_A}{h_C} = \log h_A - \log h_C$$

The mean density of the fluid in the treating section 10b may be taken as the density ($d_A$) of the fluid at orifice A—1 multiplied by the average of the ratios of $h_A$ to the heads for the different orifice locations B—1 and C—1, assuming that all three orifices are of similar design. (If the orifice characteristics differ, the corresponding changes are readily incorporated in this system.)

In designing the apparatus, an average expected value of density of the fluid at the orifice A—1 is incorporated in the transmitted motion of the rotor of 89—90 and of the rotor of 91—92. Thus, if the expected density exists at the orifice A—1, the indicator moved by the rotor of 89—90 will indicate relative to the index 102 the instantaneous value of log $d_B$ while on the index 103 may be read the instantaneous value of log $d_C$.

The rotor of 89—90 angularly moves a cam 104 having a rise proportional to the antilogarithm of its angular motion; likewise, the rotor of 91—92 angularly moves an antilogarithm cam 105. Thus the vertical movement of a roller at the lower end of a link 106 riding on the cam 104 is proportional to $d_B$ and that of 107 to $d_C$.

The mean density through the treating section 10b is determined through a differential mechanism 108 adapted to position an indicator 109 relative to an index and recording chart 110 to continuously record thereon the value of $d_m$.

It is to be understood that, if the basic capacity of flow-responsive elements A, B and C vary one from the other, then the linkage through which the arm B—6 positions 81 and the linkage through which the arm C—6 positions 82 may incorporate the necessary correction values. Or it might be taken into account at the outlet side of antilogarithm cams 104 and 105. Furthermore, the orifices B—1 and C—1 are illustrated as being adjustable as to $cfD^2$ value and this may be taken into account by providing means at 111 and 112 for manually adjusting the effect of angular positioning of cam 104 upon one-half of differential 108. Thus cam 104, which is angularly moved proportional to log $h_A/h_B$, will position the arm 111 relative to the index 113 according to $$d_A h_A (cfD_A^2/cfD_B^2)^2/h_B = d_B$$

Likewise on 114 may be indicated $d_C$. The differential 108 then positions the arm 109 according to $d_m$.

At 115 is indicated a manual adjustment of the motion of arm 109 to take into account deviations in value of $d_A$ from design conditions, as might be caused by changes in temperature or character of the charging stock, etc.

The arm 109 is adapted to position a logarithmic cam 109A for moving a transmitter 83 proportional to log $d_m$ plus log V (the volume V of the system between B—1 and C—1 being constant). The flow-responsive element A positions a cam 97A for moving a transmitter 80A proportional to log $h_A$, which (so long as $d_A$ remains constant) gives log W, where W is the weight-rate of flow. The differential motor 93—94 is then under the influence of the transmitters 80A and 83, representative of log W and log $Vd_m$ and the resulting angular motion of cam 116 is:

$$\log Vd_m - \log W = \log t$$

Cam 116 is of antilogarithm design and the arm 117 is moved relative to record 118 to indicate the time of detention of the fluid in the treating section 10b.

The arm 117 angularly positions a transmitter 84, in turn positioning a receiver 95 and cam 118. Closely related is a cam 119 positioned by a receiver 96 under the control of a transmitter 85 responsive to the temperature of the fluid in 10b. Temperature-responsive bulb 120a is located in the fluid at the outlet of the heating section 10b, while bulb 120 is located at the inlet to the section. The corresponding Bourdon tubes 121 and 122 are arranged to position the transmitter 85 according to the mean temperature of the fluid through the section 10b. The cams 118 and 119 may be designed as uniform rise cams or to take care of any characteristics or relationship as may be desired. Through their interrelation an indicator 123 is continuously positioned relative to an index and recording chart 124 to advise a time-temperature relationship for the conversion section 10b.

An indicator pen 125 is positioned by time-temperature relation but is further provided with a stock factor adjustment 126 so that the pen 125 may record on the chart 124 the yield per pass. The stock factor adjustment 126 may be used to correct for deviations in anilin number, A. P. I. gravity, and such other variable characteristics of the charge as may be found to affect the yield per pass.

In Fig. 10b is illustrated a further arrangement to indicate or record mean density in the conversion zone, which apparatus may, if desired, be combined with suitable instruments (not shown) to determine or record time of detention, yield per pass, etc. A rate-of-flow meter A is of a type having a shaped, liquid-sealed bell adapted to correct for the quadratic relation between differential head and rate of flow, and positions a cam 130 directly in accordance with W. The transmitter 131 moves proportional to log W.

The differential receiver 132—133 is responsive to log W and log $h_B$ and positions the antilogarithm cam 134 according to $$\log W - \log h_B = \log W/h_B$$

that is, according to log $d_B$. Likewise the receiver 135—136 is responsive to log W and log $h_C$, positioning the antilogarithm cam 137 according to log $W - \log h_C = \log W/h_C$, that is, according to log $d_C$. The pointer 138 then indicates relative to the index 139 the value of $d_B$, and pointer 140 relative to index 141, the value of $d_C$. The two are algebraically added through the mechanical differential 108 and the pen 109 indicates and records means density $d_m$ on chart 110. In the event that it be desired to determine time of treatment or a selected time-temperature relation for the section 10b, the instruments shown in connection with pen arm 109 in Fig. 10a may be utilized.

Having now discussed the manner in which the variables of the treatment of the fluid may be made manifest and the several variables along the path of flow correlated, attention is directed to the manner in which the aforesaid variables may be caused to exert automatic control of the process.

Referring now to Fig. 11a, it will be observed that the system comprises a once-through path 10 provided with a first heating section 10a and a second heating section 10b, similar to that described in the previous showings. Flow-responsive elements A, B, and C are positioned, respectively, at the inlet to the system, and at the points selected respectively as the inlet and the outlet of the second heating section 10b.

The fuel is fed to the burner 11 through pipe 11a controlled by pressure-responsive valve 11b. The air supply enters through flue 150, passes a damper 151, and enters the combustion chamber 152 of the furnace. The temperature at the entrance of the section 10b is determined by a thermocouple 153 connected through leads 154 and 154a to any suitable type of potentiometer pyrometer 155, for example, such as that disclosed in Ryder U. S. Patent No. 2,015,968. The pyrometer actuates a reversing Warren self-starting synchronous A. C. motor 156 in one direction or the other to move a pen arm 157 around the pivotal support thereof, 158.

The movement of the rotor of the motor 156 also positions the right-hand end of a lever 159 which is pivoted at 160, the movement of the said right-hand end of the lever 159 being, of course, vertical in accordance with the variations in the temperature at thermocouple 153. As said lever 159 pivots about point 160, the stem 161 of a pilot valve 162 is moved vertically to control the fluid pressure in line 163. The position of differential "Selsyn" 164 is controlled by the manifestations of the flow-responsive elements A and C, and moves an arm 165 in accordance with the density at the outlet of section 10b. Similarly, the Selsyn 166 is jointly acted upon by the flow-responsive elements A and B to position an arm 167 in accordance with variations in the density at the inlet of section 10b.

A mechanical differential 168 causes variations in the vertical position of the pivot point 160 as the mean density in section 10b varies. It will, accordingly, be apparent that the position of the pilot stem 161 is affected both by the temperature at the inlet of section 10b and by the mean density of the fluid therein.

The varying air pressure in line 163 passes through valves 170 and 171, which are respectively connected through lines 172 and 173 to pressure-responsive control devices 11b and 174 respectively. Valve 170 may be closed, wherefrom the control pressure from pilot valve 162 will pass through valve 171 and cause means 174 to vary the position of damper 151, thereby to control the amount of air admitted to the combustion chamber 152.

On the other hand, valve 171 may be closed and valve 170 opened, in which case the pressure variations are transmitted to move valve 11b to vary the amount of fuel fed to burner 11.

In the system shown in Fig. 11a, any change in operating conditions affecting either the mean density of the fluid in section 10b, or the temperature at the inlet of this section, or both, will automatically cause a readjustment of the control devices for the elements of combustion supplied to the furnace. The system will therefore be brought back to the desired operating conditions. Thus, if the mean density varies, the pivot point 160 is moved and the rate of firing will be altered. The change in the rate of firing in turn varies the temperature at the thermocouple location, with the result that the bar 159 pivoting around 160 is displaced and the pilot stem 161 is moved back toward its original position.

In Fig. 11b is shown another system of control similar to that shown in Fig. 11a except that in Fig. 11b the recirculation of the products of combustion around the bridge wall in the furnace, as well as the fuel supply, may be utilized to control the heat supplied to the second heating section 10b. Moreover, the furnace of Fig. 11b is shown as provided with a set of roof tubes, these latter being frequently referred to in a furnace of this type as the radiant tubes.

The recirculation is varied by altering the speed of fan 180 which is driven by motor 181, the latter having a rheostat 183 in the control circuit thereof. The rheostat is actuated by an air actuated mechanism 174a, which latter is, in turn, controlled by the variations in pressure from the pilot valve 162a.

As hereinafter pointed out, the alternative controls for the heating may be utilized either independently or conjointly, or sequentially, as desired.

The various recording, responsive, and operating instrumentalities are arranged in substantially the same manner as in Fig. 11a, particularly so far as the adjustable orifices, the fixed orifice, and the differential Selsyn motors are concerned. The vertical positioning of the pilot stem 161 is controlled in part by the mean density through the second heating section, by the movement of the differential 168, as heretofore explained. In Fig. 11b, however, the temperature measured by the pyrometer is a mean temperature through the section 10b, obtained by averaging the temperatures taken from two thermocouples, one, 153, at the inlet of the section, and the other, 153a, at the outlet of the section. The potentiometer 155 actuates the motor 156 to position the right-hand end of the lever 159 in accordance with such mean temperature, and at the same time to record the mean temperature on chart 157a.

Assuming that the mean density through the section 10b remains constant, a deviation in mean temperature through that section from a desired value will shift the pilot stem 161 to vary the pressure transmitted from the pilot valves 162, 162a, through line 163 or 163a, or both. If valve 171a is open, the rheostat controller 174a will be actuated, thereby setting rheostat 183 to a new position and altering the speed of fan 180 which regulates the recirculation of the flue gas. Such variation in recirculation will, in turn, vary the mean temperature of the fluid passing through section 10b and will cause lever 159 to reset the pilots.

On the other hand, if for some reason, such as variation in pressure, rate of charge, or other variable, the mean density through section 10b should vary it would be desirable to establish a new mean temperature. Such new mean temperature may be established by virtue of the fact that the change in mean density in section 10b will cause a vertical shift in the pivot 160 about which lever 159 moves, and this, in turn, will vertically move the stem 161 of the air pilot valve 162a again to alter the speed of fan 180 and thus vary the temperature in section 10b.

The diaphragm operated valve 11b which controls the supply of fuel to the burner 11 may be actuated by the pilot valve 162, so that the fuel supply may be varied as desired, it being understood that valves 170 and 171a are provided in order that either one or both of the control means for varying the heat supply may be used. However, these control valves 170 and 171a, together with the motor controlling recirculation and the diaphragm valve controlling the fuel supply, may advantageously be used in sequentially controlling flue gas recirculation and rate of firing.

As above indicated, when the relation of temperature and pressure departs from optimum conditions with, for instance, the temperature decreasing, the density in section 10b increases and an increase in the rate of flue gas recirculation may not be sufficient to take care of the required change. It may therefore be desirable to vary flue gas recirculation within the range of the change which can be effected thereby, and thereafter to adjust the fuel supply to provide for control outside the range of the flue gas recirculation control. After the fuel has thus been increased, it is desirable that the flue gas recirculation fan or damper should be "backed off" into the normal controllable range for such fan. This type of operation may be described as the sequential control of flue gas recirculation and rate of firing.

This may be accomplished by using two different loading pressures from the pilots 162 and 162a and the control loading pressure lines may be provided with selector valves or shut-off valves. The arrangement is such that a hand-actuated valve in the fuel supply line may be adjusted for a given rate of charging to a maximum of, say, 75% of the fuel supply capacity and the diaphragm valve 11b may be adjusted to operate only over a limited range of fuel capacity, say 70% to 75%.

When the temperature decreases and density increases, the loading pressure will first cause an increase in rate of recirculation to its maximum and then sequentially the firing control valve 11b will pick up from its normal adjustment of about 70% of the rate and carry on up to 75%. When operating in this range, the loading pressure from the same or another land of the pilot valve may at the same time cause a backing-off of the rate of recirculation in proper proportion. With a different rate of firing, the hand control valve 170 in the fuel line may be set so that the regulating valve 11b will operate over a range of, say 80%–85% of its capacity.

Referring now to Fig. 11c, only one flow-responsive element B is employed in section 10b. A suitable location for such a single flow-responsive element may be ascertained by exploration of the section of the particular furnace, as heretofore explained.

The mean temperature is taken at the same point at which the density is measured, said temperature being measured by a thermocouple 153 similar to that hereinbefore described, associated with a potentiometer 155 and Warren motor 156, in the same manner as indicated previously. One of the advantages of using a single flow-responsive element B is the elimination of the differential mechanism 168 (Fig. 11b), it being observed that but one "Selsyn" is required to effect the movement of the pivot point 160 of lever 159.

It will be further observed that the fan 180 for controlling the flue gas recirculation and the damper 151 for controlling excess air are both shown in this figure and, for purposes of illustration, the excess air control can be used instead of the direct control of the fuel supply. The flexibility of control which is obtainable in connection with this aspect of the present invention will thus be apparent.

In Fig. 12a a system embodying a heated coil and a so-called "reaction chamber" has been illustrated. For simplicity of illustration, only two flow-responsive elements, A and B, are shown, one at the inlet and the other at the outlet of the furnace coil. These two elements are correlated as shown to move the pivot point 160 of lever 159. For sake of simplicity, indicators which may be used in connection with said lever have been omitted, it being understood that the showing in previous figures is sufficient to illustrate the possibilities in this connection.

A reaction chamber R is positioned to receive the fluid after it has been heated and after it has passed through the adjustable orifice B—1. At the outlet of this reaction chamber, a back-pressure control valve 185 is positioned in a fluid line 186, through which latter line the treated material is passed from the chamber into a vapor separator V. S. The pressure of the fluid leaving reaction chamber R affects, through line 187, a Bourdon tube 188, which latter is connected to the right-hand end of the lever 159. Accordingly, the stem 161 of pilot valve 162 is moved either in response to the change in position of the point 160—following a change in the density at the outlet of the heated section—or in response to movement of the Bourdon tube 188.

With the instrumentalities arranged as just described, it is possible to utilize the density as it affects the left-hand end of the lever 159 to establish a new back-pressure value by movement of the valve 185 so that the density at B—1 is maintained at the optimum value. The density at the outlet of the heated section may vary, not only because of changes in back-pressure, but also because of variations in any other condition, for example, in the heat supplied to the coil. Assume, for instance, that the optimum density at B—1 is 10 lbs. per cubic foot, and the back-pressure at the valve 186 is 300 pounds per square inch. If now, through variation in heating, rate of charge, or other factor, the density at B—1 increases to a value of 12 lbs. per cubic foot, it is necessary to vary the effect of valve 185 so that the back-pressure is held at some lesser figure than 300 lbs. per square inch, in order to maintain the density at 10. This is accomplished when, in response to the aforedescribed change in density, the left-hand end of lever 159 is moved with subsequent control through the air pilot valve 162 on the diaphragm of valve 185 and the establishment of a new pressure value.

The instrumentalities as above discussed in connection with Fig. 12a, whereby a constant density may be maintained at the outlet of the tube in which the fluid is heated, may also be utilized to insure a constant total heat in the fluid. Accordingly, one particular field in which the present invention is particularly useful, is in connection with a hydrocarbon treating system wherein the fluid, after being treated in one zone,—for instance in a heating coil,—then passes into another zone,—for example, a chamber or an enlarge tube section,—and wherein the fluid may or may not be subjected to additional heat or treatment from an external source. As before explained, the density of a fluid at the outlet of any zone wherein the fluid has been treated is a function of the total heat content of that fluid irrespective of whether such heat is latent or sensible.

Such heat supply is of particular importance when the fluid is to be thereafter passed through a zone wherein certain transformations are effected wholly as a result of the heat already contained in that fluid, and without imparting any additional heat thereto, whether the heating coil feeds into a "reaction chamber," or into a vapor separator. A knowledge of the density at the outlet of the heating section permits the control of the total heat of the fluid as the latter passes into the unheated zone, thereby making it possible to regulate the burden or duty on the subsequent equipment.

It has been found, for instance, that this control is of particular value when the residuum from the vapor separator is withdrawn to a vacuum unit for further treatment because even under these conditions it is possible closely to control the total heat which governs the distillation effected in the vapor separator. For such purposes, any suitable factor may be regulated to assure a constant output density (and constant total heat). In the diagrammatic showing of Fig. 12b, the density is maintained constant by varying the back-pressure on the line leading to the unheated zone (not shown). Another form of fluid treating apparatus to which the present invention is applicable is one wherein, after the hydrocarbon has been treated in a zone such as a heating coil, it passes to a coil of enlarged diameter. Such apparatus and system differ from the system of Fig. 12a only in that heat is imparted to the hydrocarbon in the enlarged zone.

It will be understood, therefore, that through the instrumentality of the hereinbefore described invention as applied in the present instance, one may use the determined density in arriving at the total heat or change in heat in a fluid irrespective of the character of the heat, and utilize such determination in controlling the operation of the treating system, either to regulate the heat input thereto, or to regulate subsequent steps as the heat content may vary.

In Fig. 13, an optimum time of detention or treatment is maintained by regulating the charging rate. If desired, however, either the heat supply or the rate of charge may be regulated in accordance with the density.

The system illustrated in this Fig. 13 is similar to that shown in Fig. 11b as regards the instrumentalities for determining the mean density of the hydrocarbon in section 10b. However, in addition, a cam 190 is actuated in accordance with rate of flow whence Selsyn 191 has one field positioned in accordance with the logarithm of the mean density (which is transmitted from differential 168) while the other field is positioned in accordance with the logarithm of the weight-rate of flow as transmitted from cam 190.

It will be noted that the output arm from differential 168 (the mean density-responsive means may be adjusted or corrected by a manually operated means 192 to compensate for any changes in the density of the charge from the design conditions. Incidentally, it should be noted that the correction introduced by 192 is to be distinguished from that in which the specific gravity or A. P. I. value is utilized as a "stock factor" correction, as herein described.

The resultant movement of Selsyn 191 is transmitted through a gear box 193 (which latter not only incorporates an antilogarithm cam, but also such gears as are necessary to incorporate the multiplication by the volume of section 10b), so that a recording pen 194 and an air pilot valve 195 are moved proportionally to the time of detention. A pressure line 196 transmits changes caused by the movement of the stem of air pilot valve 195 either through valve 196a to vary the fuel supply, or through valve 197 to move a diaphragm valve 198, the latter controlling the charging rate to the system.

In Fig. 13a the system of Fig. 13 is further amplified to bring in time-temperature relation, means being provided at 153 and 153a for determining the temperature at the inlet and outlet of section 10b, with the mechanical determination of the mean temperature in the section, through the agency of Bourdon tubes 198 and 199 at either end of a floating beam 200. Such mechanically obtained mean temperature is then interrelated, through the two links 201 and 202 at either end of floating beam 203, with the time value determined as shown in Fig. 13 so as to actuate the pilot 204, by movement of stem 205, as to desirably control the rate of charge or of the firing.

For sake of simplicity, those parts which have been illustrated in Fig. 13 for determining time are not shown in Fig. 13a, it being understood that such instruments may be the same. The combined movement of the time- and temperature-responsive elements actuates the stem 205 of the air pilot valve 204, this stem being desirably provided with an indicator 206 associated with a scale 207, on which a measure of the yield per pass (for specific stock for which calibrated) may be read. The pointer 194 reads "time," and that secured to 201 reads "mean temperature in conversion section." Rate of charge or rate of firing may be regulated from the pilot valve 204 and associated fluid-actuated equipment.

The above system involves a mechanical correlation of time and temperature to provide an index of yield per pass for a specific stock. If desired, variations which are likely to occur in the characteristics of the fluid passing through the system (i. e., in the "stock factor") may be automatically given weight in the practice of the invention.

Fig. 13b illustrates a further development of the system shown in Fig. 13a, and incorporates an adjustment for the varying characteristics of the fluid undergoing treatment. Only those added operating instrumentalities are illustrated which are necessary to indicate the methods of control which are available in addition to those indicated in Figs. 13 and 13a. In Fig. 13b, the linkage 205 depending from the floating beam 203 is connected to one end of lever arm 210 of adjustable length, which rotates about a laterally adjustable pivot point 211. The "stock factor" correction is applied by lateral displacement of this pivot point 211, through the agency of the reset or adjustment member 212. A pointer 213 is associated with suitable scale 214, whereby the character of the stock for which the apparatus is set may be conveniently indicated, and the system reset when the "stock factor" of the charge varies. If desired, automatic means for resetting the pivot point 211 as the stock factor of the charge varies may be used where preferred, instead of the manual reset 212 shown in Fig. 13b, whereby automatic stock factor compensation may be incorporated in the operation of the apparatus and enter into the automatic regulation of the system.

The movement of beam 210 is transferred through link 215 to lever 216 rotating about the fixed pivot 217. By this adjustment, lever 216 moves in response to "yield per pass (corrected for stock factor)," which may be recorded or indicated if desired by a pen fixed to the lever 216. The stem 205a of an air pilot valve 204a moves in accordance with yield per pass (corrected for stock factor) and through the associated fluid actuated control mechanism, the charge or the fuel supply may be automatically regulated to maintain a selected degree of conversion.

Under some circumstances it may be more convenient to determine the weight-rate of charge by gauging the fluid flowing from a tank, instead of using a charge meter such as that diagrammatically shown as A in the previous figures of the drawings. A diagrammatic showing of such practice is illustrated in Fig. 14, wherein a charge tank 220 has a float 221 operating an indicator 222 relative to an index 223 along the outside of the tank, so that one may periodically observe the latter to determine the average rate of charge. A pump 224 is used to force the charge through the coil 10a wherein the treatment takes place. In the event that it may be desirable to measure the density of the charging stock, a tap 225 is provided for withdrawing a sample.

The flow-responsive device B, shown at the outlet of the coil, is similar to that heretofore described. From the volume rate as determined by tank gauging, the charge density, and the manifestation of the element B, the in situ density at the outlet of the coil may be determined as hereinbefore explained, and the system regulated as desired. The various instrumentalities whereby the outlet density is utilized as a control basis are not illustrated in Fig. 14, in order to avoid complication. It will, however, be understood that a system in which tank gauging is employed may be operated in conjunction with any suitable control instrumentalities.

Certain aspects of the logarithmic-cam-Selsyn system described briefly herein with reference to Figs. 10a, 10b, 11a, 11b, 11c, 12a, 12b, 13, 13a, and 13b are more particularly described and claimed in the copending applications of Raymond D. Junkins, Serial No. 152,858, filed July 9, 1937, and John F. Luhrs, Serial No. 152,855, filed July 9, 1937.

In the foregoing discussion of automatic systems, particular attention has been devoted to instrumentalities based on the use of logarithmic cams in conjunction with "Selsyn" motors. Other automatic equipment may, however, be employed, and it will be convenient at this point briefly to describe a system involving the use of a Wheatstone bridge as the ratio performing means. Figs. 15a to 15d diagrammatically represent a wiring diagram of a system adapted electrically to perform the various operations to indicate the in situ density, the time of treatment, the time-temperature relation, etc.

Referring to Fig. 15a, the arm A—6 of meter A (which may be the charge meter A of Fig. 3, for example) is of insulating material but carries a conducting portion adapted to contact continuously a metallic segment 322 and to engage movably a rheostat 323 providing a resistance RC representative of the position of the float of the charge meter. A second conducting portion of the arm A—6 contacts a metallic segment 324 and movably engages a rheostat 325 providing a resistance RCI. In a similar manner the arm B—6 provides a resistance RI representative of $h_B$; and the arm C—6 provides a resistance RO representative of $h_C$.

Referring now to Fig. 15b, it will be observed that the adjustable resistances RC and RI comprise two arms of a Wheatstone bridge. A third arm includes a hand-adjustable resistance F, while a fourth arm includes a fixed resistance FI and an adjustable resistance BI. The value of the resistance BI constitutes the balancing resistance and is varied by movement of the arm 330 (Fig. 15a) through the agency of the reversible synchronous motor 331 under control of the galvanometer 332.

The motor 331 is of the self-starting synchronous type of alternating current motor and is shown as having normally energized opposed fields. Should the Wheatstone bridge become unbalanced, the needle of the galvanometer 332 will move either clockwise or counterclockwise, thereby open-circuiting one of the fields of the motor 331, resulting in a positioning of the arm 330 in direction and amount over the resistance BI to balance the bridge and cause the galvanometer needle to return to neutral position. It will be understood that the necessary gear reduction is to be incorporated between the motor 331 and the arm 330 so that the arm 330 moves at a relatively slow speed.

The Wheatstone bridge thus serves continuously to determine $d_B$ by solving the Equation $c$. Such density may be continuously indicated on the index 333 and the value of the density is continuously represented by the resistance BI and BII.

In like manner the value of $d_C$ may be indicated on the index 334 and be continuously represented by the value of the resistance B21.

As shown, the same power source 336 is connected across the points 326 and 328 for both bridges. A motor 337 for the second bridge is under control of a galvanometer 338 connected across the points 327 and 335.

It will now be observed that the resistance B11 is representative of the value $d_B$ while the resistance B21 is representative of the value $d_C$. To determine the mean density ($d_m$) of the hydrocarbon in the section 10b (Fig. 3), the average of the ratios of the head is obtained by including the resistances B11 and B21 in a third bridge circuit (Fig. 15c). In this bridge circuit, the value of the fixed resistance A is twice that of the value of the fixed resistance B. The adjustable resistance B3 is varied by positioning arm 339 through the agency of a motor 340, under the control of a galvanometer 341. The arm 339 will then indicate, relative to the index 346 the value of $d_m$ and the value of the resistance B3 will be representative of $d_m$.

In designing the apparatus, the average expected value of the specific gravity or density of the charging stock is incorporated in the resistances RC or the motion of the arm A—6. Additionally, a hand adjusted rheostat 347 is provided to take care of variations in the charge density which may occur from time to time.

The arm A—6 is adapted to vary the resistance RC1 proportional to $$\sqrt{h_A}$$

which, so long as the charge density ($d_A$) remains constant, is proportional to the weight-rate of charge W. This value is then included as an arm in a Wheatstone bridge circuit (Fig. 15c), including the value B3, the fixed resistance B, and equal fixed resistance B4 and an adjustable resistance T, to determine the time of treatment in section 10b (Fig. 3).

The resistance T is varied through the movement of an arm 351 positioned by a motor 352, under control of a galvanometer 353. An index 354 may be graduated to read directly the value of the time of detention of the hydrocarbon in the second heating section 10b (Fig. 3). In order that the resistance RC will represent the value of W, the resistance 325 is shaped according to $$\sqrt{h_A}$$

With the resistance T, is varied a resistance T1 representative of time of detention and this is incorporated in a bridge circuit (Fig. 15d) in relation to a resistance TE, representative of the value of the temperature, this resistance being positioned, for example, by means of a Bourdon tube 321. The bridge circuit of Fig. 15d includes a resistance TT varied by an arm 359 moved by a motor 360, under the control of the galvanometer 361 for indicating the desired relation of time and temperature, represented respectively by T1 and TE. This relationship may be continuously recorded at 362. Hand adjustable rheostats 363 and 364 permit adjustments for the constants in selected time-temperature relationships where necessary.

The pointers for indicating density, mean density, time, time-temperature relation, etc. may be provided with pilot valves where desired, in a manner similar to that described in connection with the logarithmic cam system, to provide a suitable means for automatically regulating the process carried out in the flow system. The possibilities for automatic control have been sufficiently indicated hereinbefore in connection with Figs. 9, 11a, 11b, 11c, 12a, 12b, 13, 13a, and 13b to render it unnecessary to illustrate the application of the various pilot valves, fluid actuated valves, etc. to the system shown in Figs. 15a to 15d, since such application will be readily apparent to those skilled in the art.

Certain aspects of the Wheatstone bridge automatic system briefly outlined above are more particularly described and claimed in the copending applications of John F. Luhrs, Serial No. 152,857, filed July 9, 1937, and Raymond D. Junkins, Serial No. 152,858, filed July 9, 1937, to which reference may be had for a more detailed discussion.

In the foregoing description, orifice meters have been employed as illustrative of a suitable type of flow-responsive element. As previously stated, however, such meters constitute only one of several types which may be employed if desired. Accordingly, it is convenient at this point to illustrate the use of equivalent types of flow-responsive elements. At the same time, a third type of automatic apparatus will be described, to illustrate the flexibility of the present invention, not only with respect to the type of metering element used, but also as regards the variety of automatic correlating instrumentalities which the operator may employ in addition to or in lieu of the manual methods heretofore disclosed.

Figs. 16a and 16b diagrammatically illustrate the use of the positive displacement type of flow-responsive elements, in conjunction with an automatic correlating system involving the use of a co-operating disc and ball.

The hydrocarbon charging stock enters the conduit 10, proceeds through a zone, 10a, wherein treatment or processing may be effected, and is thereafter withdrawn from the system. A volumetric or displacement type of flow-responsive element 397 is located in the conduit 10 ahead of the heating means 11, while a similar flow-responsive element 398 is located after the flowing fluid has been subjected to heating.

The positive displacement meters comprise as a primary element, a chamber or chambers through which the fluid passes in successive isolated volumes. The secondary element of such a meter usually is a counter with suitably graduated dials for indicating the total volume that has passed through the meter. In Fig. 16a, however, the rotatable shaft which normally actuates such a counter is herein adapted to drive or position the mechanism which functions to determine density of the fluid.

The primary elements 397 and 398 which are inserted in the conduit 10 each have complementary rotatable members 399 which are mounted for rotation upon shaft centers in such a manner as to be in sealing contact with the inner wall of the meter casing and with each other. Thus, an effective seal is provided across the conduit 10 at device 397 and at device 398. However, inasmuch as the elements 399 are rotatable, pressure of the hydrocarbon at the entrance to the device 397 causes rotation of the elements 399 therein, which causes the passage of definite trapped portions of fluid through the device 397 from the inlet to the outlet. The operation of the device 398 is similar.

For a given weight-rate of charge the speed of flexible shaft 400 leaving the primary element 397 varies inversely as the density of the fluid. The same is true of the speed of a shaft 401 leaving the primary element 398 in regard to the fluid flowing therethrough.

By interrelating or comparing the speed of the shafts 400 and 401, the relative density between the two locations may be determined. The density of the fluid before the heating means 11 may be compared with its density at a location after the heating means whereby the change in density is due to the treatment or heating.

While the speed of the shaft 400 as well as the speed of the shaft 401 will vary with the rate of flow of fluid, still if comparison of the speed of the shafts 400, 401 is made where the same fluid passes successively through the meters 397, 398, then variations in the rate of flow will have no more effect upon the one shaft speed than upon the other shaft speed, and may therefore be disregarded entirely. Thus the speed of the shafts 400, 401 will vary with variations in density at the individual meters 397, 398.

Assuming for the moment that the density of the fluid in the conduit 10 entering the meter 397 remains constant ($d_A$) then the density of the fluid passing through the meter 398 ($d_B$) may be determined as follows:

$$d_B = d_A \frac{S_{400}}{S_{401}} \qquad (3A)$$

where $S_{400}$ = speed of shaft 400 of meter 397.
$S_{401}$ = speed of shaft 401 of meter 398.

This is, of course, predicated upon the fact that the meters 397 and 398 are of the same size and design so that if the same volume rate of fluid at the same density conditions is passing through the two, then the speeds of the shafts 400, 401 are the same.

A disc 402 is adapted to be rotated by the displacement meter 397 through the shaft 400. Frictionally engaging the disc 402 is a sphere or ball 403 likewise frictionally engaging a rotatable spool 404 supported by a carriage 405. The spool 404 is provided with an arm 406 as shown in Fig. 16b carrying a pair of contacts 407 and 408 connected through suitable slip rings in a drum 409 to opposed fields 410 and 411, respectively, of a motor 412.

The drum 409 is rotated by the meter 398 through the agency of the shaft 401 and carries a contact 413 co-operating with the contacts 407, 408. The contact 413 is connected through a slip ring in the drum 409 directly to the power source 414 through a conductor 415. The arrangement is such that upon engagement of the contact 413 with the contact 407 the field 410 is energized, and conversely upon engagement of the contact 413 with the contact 408 the field 411 is energized. The motor 412 is adapted to drive an indicating-recording pen arm 416 relative to a chart 417 through gears 418 and in unison therewith the carriage 405 through a gear 419 meshing with a suitable rack 420 carried in the carriage 405.

In operation, assuming the system to be in equilibrium, the contacts 407, 408 will be rotated at synchronous speed with the contacts 413 so that the fields 410, 411 of the motor 412 are de-energized. Upon an increase in the rate of firing through the burner 11 with a corresponding decrease in density of the fluid passing through the meter 398, the speed of the shaft 401 will increase relative to the speed of the shaft 400. Thus the rotative speed of the drum 409 and of the contact 413 will increase relative to the rotative speed of the disc 402, the spool 404 and the contacts 409, 408. The arrangement is such that the contact 413 will engage the contact 407 causing energization of the field 410 and rotation of the motor 412 in proper direction to move the carriage 405 to the right on the drawings, whereby the radius of contact of the sphere 403 with the disc 402 relative to the center of the disc 402 will be increased, and thereby the speed of rotation of the spool 404 and contacts 407, 408 will be increased relative to what it was previously, and such action will continue until the rotative speed of the contacts 407, 408 and the contact 413 are in synchronism and the contact 413 is not close-circuited with either the contact 407 or the contact 408, whereafter rotation of the motor 412 will cease. The position of the carriage 405 and correspondingly (through the gear 418) of the indicator 416 relative to the chart 417 is indicative of the density of the fluid passing through the meter 398. This may be seen from the following:

Angular travel of 406 = Angular travel of 400 × Radius R
Angular travel of 413 = Angular travel of 401
But in equilibrium—
Angular travel of 406 = Angular travel of 413
Therefore—

$$R = \frac{\text{Angular travel of 401}}{\text{Angular travel of 400}}$$

Thus the radial distance R from the center of the disc 402 to the point of contact of the sphere 403 with the disc 402 is a measure of the ratio of the speeds of the shafts 400, 401, and knowing the density of the fluid passing through the meter 397, said radius is a meaure of the density of the fluid passing through the meter 398.

While the displacement meter showing has been illustrated only so far as relates to the ascertainment of the properties of the fluid, it will, of course, be understood that the movements occasioned by the indicating means 416 may be utilized, where desired, automatically to move suitable control instrumentalities as, for instance, those described in connection with any of the automatic control systems hereinbefore illustrated.

Certain aspects of the system diagrammatically shown in Figs. 16a and 16b are more particularly described and claimed in copending applications of J. F. Luhrs, Serial No. 152,856, filed July 9, 1937, and Raymond D. Junkins, Serial No. 152,858, filed July 9, 1937

The processing of fluids in the presence of injected gases, as, for instance in the cracking of petroleum in the presence of the injected hydrocarbon gases (for example, the recirculated gaseous products), presents a type of operation wherein the character of the stock is subject to considerable variation, due to fluctuations in the quantity and character of the injected gases. When such a system is operated with prior art control devices, these variations in charging stock are not readily made manifest to the operator. The present invention, on the other hand, provides a means which is especially valuable in fluid processing operations involving gas recirculation, particularly where the unit is operated at elevated temperatures and pressures, since all variations in operating conditions, including fluctuations in character of the charging material, are promptly indicated by the flow-responsive equipment.

Fig. 17 illustrates the application of the method and apparatus of the present invention to such a process, as exemplified by the cracking of petroleum in the presence of recirculated gaseous hydrocarbons. The application of the invention to a furnace having separately fired "sensible heat" and "conversion" sections is also illustrated, as an obvious alternative to the type of furnace hereinbefore described.

The charging stock enters the system through line 501, and is forced by pump 502 into branch conduit 503 through pressure regulating means 504. A regulated quantity of the charging stock passes through flow-controlling element 505 actuating valve 506 in conduit 507, entering the transfer line 508, where it mixes with the synthetic crude ahead of the vapor separator V.S. In like manner, a regulated quantity of the charging stock passes through flow control means 509 actuating valve 510 in branch conduit 511, and may selectively be discharged into vapor separator V.S. through block valve 512, thus providing the necessary reflux for the proper functioning of the vapor separator; or may be introduced through valve 513 into an intermediate point of bubble tower 514. Through conduit 515 and liquid-level regulating means 516, actuating control valve 517, a quantity of the charging stock is admitted to absorption tower 518.

Depending upon the temperature of the charging stock entering pump 502, it may be found desirable to install heat exchanger means (not shown) in conduit 503 between branch conduits 511 and 515 for the purpose of heat economy and raising the temperature of the charging stock, and it may also be essential or desirable to place cooling means (not shown) in conduit 515 to provide for the cooling of the stock admitted to the absorption tower 518, these steps being dictated by the temperature condition of the stock, the steps and means referred to being familiar to those skilled in the art.

Stock Z, accumulating in the base of bubble tower 514, flows through conduit 519 to pump 520, being discharged into conduit 521 through flow-control means 522 actuating valve 523. In like manner rich oil accumulating in the base of absorption tower 518, designated as stock Y is conducted through conduit 524 to pump 525, discharging into conduit 526 in which is located flow control means 527, actuating valve 528.

The mixture of stocks Z and Y are combined in definite proportions in conduit 521. The in situ density of the combined stocks in conduit 521 may be determined by correlating the manifestations of the flow-responsive element 529 and the pressure differential meter 530 in vertical line 531, the details of this procedure being more particularly described and claimed in an application of Junkins, Serial No. 291,707, filed of even date herewith.

The combined stock enters the furnace through the economizer or convection heating section 532, from which it is conducted through conduit 533 to a separately fired sensible heating section 534, in which the hydrocarbon fluid is raised substantially to conversion conditions. The hydrocarbon is then conducted through conduit 535, in which is located an adjustable orifice 536 associated with a secondary meter 537, and temperature-responsive element 539, into a separately-fired conversion section 538. In conversion section 538 the hydrocarbon fluid is subjected to conversion conditions of time and temperature sufficient to effect the desired degree of conversion. The hydrocarbon fluid is then conducted through conduit 508, in which are installed temperature-responsive element 539a, an adjustable orifice 540 associated with a secondary meter 541, and back-pressure-regulating means 542, into vapor separator V.S.

In vapor separator V.S., a rough fractionation of the synthetic crude is effected, the uncondensed vapors passing overhead through conduit 543, and the condensate or residue accumulating in the base of the vapor separator is discharged through conduit 544 in which is located valve 545 responsive to liquid-level control means 546. The character of this residue will depend largely upon the temperature and pressure conditions prevailing in vapor separator V.S. In some cases it may be found desirable to subject this residue to further distillation in a tower (not shown), a portion of the residue being returned to the unit or processed in some other unit.

The vapor entering fractionating tower 514 through conduit 543 is composed of a condensate recycle Z, an overhead distillate of substantially gasoline boiling range X, and a wet gas G. These vapors ascend through suitable fractionating means in tower 514 and the uncondensed portions leave through conduit 547 and are condensed and cooled in 548 before entering gas separator 549, from which the wet gas G goes overhead through conduit 550, and the condensed distillate X leaves through conduit 551 entering pump 552, which may have the dual function of supplying reflux to fractionating tower 514 and discharging product to the stabilizer 553.

The reflux X is pumped through conduit 554, this reflux medium being regulated by temperature controller 555 actuating valve 556 in response to temperature-responsive element 557. Stock X is also discharged through conduit 558, in which is located valve 559 actuated by the liquid-level controller 560, into stabilizing column 553. In this column the dissolved gas contained in stock X is fractionated from the liquid, and the stabilized product W, suitable for atmospheric storage, is drawn off from reboiler 561 through conduit 562, in which is located valve 563 actuated by the liquid-level means 564. The stabilized product is cooled through suitable means 565 to a temperature suitable for the storage of such products. Reboiler 561 is supplied with a suitable heating medium in heating element 566 required for the proper functioning of the stabilizer column.

The dissolved gas fractionated out of stock X leaves the top of stabilizer column 553, through conduit 567, and cooling means 568, entering reflux drum 569, in which the the reflux condensate and noncondensable gases are separated. The noncondensable gases leave the top of the reflux drum 569, through conduit 570 and back-pressure regulating means 571 into absorption tower 518 through conduit 572. The reflux condensate leaves reflux drum 569, through conduit 573, entering reflux pump 574 where it is discharged through conduit 575, in which is positioned flow control means 576 actuating valve 577 controlling the reflux pump. The excess condensate is discharged through branched conduit 578 in which is located control valve 579 actuated by liquid level control 580, into absorber 518 through conduit 572. If desired, wet gas from some other source may be introduced into the system through line 581, and these fluids, together with wet gas G, ascend through the absorber tower 518, coming in contact with absorption oil (for example, the charging stock) and the unabsorbed dry gas leaves the top of absorber 518 through conduit 582, in which is located back-pressure regulating means 583.

The manifestations of the flow-responsive elements 529, 530, 537, and 541 are transmitted to a receiving and controlling center where the indications of flow-responsive elements 529, 530, and 537 are interrelated by suitable means (not shown) to obtain a continuous indication of the in situ density of the fluid at the outlet of the sensible heat section 535, from the relative position of the arm 584 with reference to scale 585. The transmitting elements and the receiving and controlling center 85 may comprise, for example, the instrumentalities described above in connection with the automatic system involving the use of logarithmic cams and "Selsyn" motors, or those shown in connection with the Wheatstone bridge system.

As hereinbefore pointed out, due to the fact that the in situ density of the fluid is reflective of the total heat of the fluid at any given point, the in situ density affords a sensitive and reliable means of controlling the fuel supply to the sensible heat section 534 by regulating fuel supply control valve 586 through the agency of a suitable pilot-valve mechanism 587, thereby controlling the density to a predetermined selected value. However, inasmuch as the greater part of the heat imparted to the fluid in the sensible heat section 534 reflects itself as a temperature rise, temperature-responsive means 539 may be employed if desired in lieu of the in situ density-responsive instrument, as a means for controlling fuel supply valve 586.

In some cases it may be found desirable to interrelate temperature- and density-responsive elements through suitable relay mechanism for effecting control of the sensible heating section by the regulation of fuel control valve 586. The control of the heat-release to the sensible heating section 534 may therefore be accomplished optionally, either through the use of in situ density, or temperature-responsive means, or the interrelation of in situ density and temperature-responsive means, the primary elements of such means being located at any desired points in the path of flow which are found to be sufficiently reflective of the heat absorbed to function satisfactorily as a means of control.

The control of the heat supply in the conversion section 538 is accomplished by utilizing the manifestations of the flow-responsive instrumentalities in conjunction with temperature-responsive means. The indications of flow-responsive instrumentalities 529, 530, 541 and temperature-responsive means 539 and 539a are transmitted to the receiving and controlling center where they are interrelated by suitable means (not shown) to reflect the time-temperature relationship entering into the solution of the yield-per-pass equation. The indication of the yield per pass provided by the relative position of arm 588 with reference to the scale 589 is employed as a means for controlling the fuel supply to the conversion section 538, this being accomplished by the positioning of the stem of a suitable pilot-valve mechanism 590 from the yield-per-pass indicating arm 588, the pilot-valve regulating the fuel supply control valve 591.

By means of the system disclosed with reference to Fig. 17, the operation of the unit may be subjected to control in order to maintain any desired yield per pass or degree of conversion. By an exploratory procedure, the optimum yield per pass using various proportions of recirculated gas may be established and thereafter the instrumentalities may be adjusted in order constantly to maintain the preferred conditions. The great flexibility of such system will be readily apparent to anyone skilled in the art.

In the foregoing detailed description, the invention has been illustrated with reference to two types of flow-responsive elements, namely, orifice meters, and positive displacement meters. While the orifice type meter has been found generally satisfactory for petroleum conversion processes, in some instances other types of metering devices may be found desirable: for example, Thomas meters, pitot tubes or the like (see "Fluid Meters" report, loc. cit.). All such equivalent flow-responsive elements are to be understood as included within the contemplation of the present invention.

Again, for the purpose of determining the weight-rate of flow of the hydrocarbon under treatment, the use of a charge meter at the input side of the system has been illustrated in several figures of the drawings. It should be understood, however, that any suitable means, for example, pump displacement, tank gauging (as shown in Fig. 14) or the like, may be used to ascertain weight-rate or factors thereof either at the input side of the system or, if preferred in any particular instance, at any other point of the flow path, such as the outlet of the system. All such alternatives are to be understood as within the contemplation of the present invention.

Furthermore, in describing the invention, particularly as regards automatic means, specific types of apparatus have been illustrated in order to render the description as clear as possible. It should of course be remembered that such drawings are purely illustrative, and that means equivalent to those specifically described may be substituted, where desired, without departing from the spirit and scope of the invention. Thus, the various recording and control mechanisms, such as the charts, pilot valves, pressure-responsive valves, etc., may be replaced by equivalent means well known in the art for accomplishing similar functions.

Moreover, although particular attention has been devoted to the thermal cracking of petroleum, this has been done merely for illustrative purposes, in order to indicate the flexibility of the invention and the advantages which flow therefrom. Other hydrocarbon conversions are to be understood as included within the purview of my invention, without regard to whether such conversions involve chemical or physical changes or both; or whether the process includes the abstraction or addition of heat or any other type of energy; or whether the transformation, in the case of a chemical conversion of the hydrocarbon, is effected with or without the use of reagents, or in the presence or absence of catalysts, promotors and the like; or whether the particular hydrocarbon undergoing processing constitutes a single molecular species or a mixture of such species. As illustrative examples of the type of conversions contemplated in the present invention, the following may be mentioned: physical changes such as those occurring in distillation and the like; chemical changes such as those occurring in polymerization, condensation (including alkylation), isomerization, cyclization, dehydrogenation, cracking (including reforming and vis-breaking), degumming, desulfurization and the like. All such changes or transformations are to be understood as included within the scope of the term "conversion" as herein employed.

For reasons which are familiar to those skilled in the art, the desirable degree to which conversion should be carried in processing a hydrocarbon fluid is dictated by a variety of circumstances, such as the capacity and efficiency of the plant, the character of the charging stock, the quality of product desired to be produced, and like considerations. The degree of conversion (for example, yield per pass in cracking) which for any reason (arbitrary or otherwise) is selected as desirable is herein called the "optimum" degree of conversion. The use of the word "optimum" in connection with any other process factor or variable bears the same significance.

The term "in situ" is used herein to characterize the directly-determined density of the hydrocarbon fluid as it exists under operating conditions prevailing in the flow system. The term serves to distinguish the density determined under flowing conditions from the density determined under other conditions, for example, those of the sampling procedure of the prior art.

The term "density" as employed in the specification and claims obviously includes not only mass per unit volume, but all expressions providing an equivalent description of the property; for example, the reciprocal of density (i. e., the specific volume), the specific gravity, or any function of the density as given by degrees A. P. I., etc. Moreover, expressions such as "determining the density" include also the determination of manifestations equivalent to or representative of density or a function thereof; for example, the extent of movement of a mechanical member providing an index or measure of such density; or an electrical or pneumatic manifestation or response, the character of which provides an index or measure of density; and all similar and equivalent means for rendering a density change manifest or useful.

The use of the word "determining" in connection with time or yield per pass or time temperature relation or the like should also be understood as including not only the numerical value of such factor or variable or functions thereof, but also any manifestations equivalent thereto; for example, mechanical, pneumatic or electrical responses, the character of which provides an indication of changes in such factor or variable.

While many of the drawings have shown time of treatment interrelated with the mean temperature of the conversion section in the determination and control of degree of conversion, it is to be understood that this is illustrative of only one of the preferred embodiments of the invention, and is not to be construed as a limitation. If desired, a single temperature at a selected point, such as, for example, the outlet of the conversion section, may be utilized instead of the above-mentioned mean temperature. Such temperature at a selected point may be incorporated in, for example, any one of a variety of empirical yield per pass relations, wherein it is given appropriate significance or weight. Instruments may be constructed and control may be effected from empirical relationships so constructed, and the choice of the point or points where the temperature manifestation is made available is to a large extent arbitrary. In like manner, the temperature at a number of points may be appropriately weighted in accordance with any desired method of introducing the temperature element into the control system.

While it is apparent that the present invention is applicable to industrial processes involving the conversion of fluids other than petroleum in a continuous flow system, such applications are more particularly described and broadly claimed in my co-pending application Serial No. 152,860, filed July 9, 1937, to which reference may be had for a more detailed discussion. The present application is directed more particularly to hydrocarbon conversion, inasmuch as this constitutes an especially important industrial process, with problems which in many instances are peculiar to the industry in question, because of the characteristically complex chemical and physical properties of hydrocarbon fluids.

In the foregoing detailed description, it is apparent that innumerable variations may be made by those skilled in the art without departing from the spirit and scope of the present invention. Accordingly, all such modifications and variations are to be understood as included within the ambit of the appended claims, which are to be broadly construed in view of the long-felt need which is supplied by means of this invention.

I claim:

1. A method which comprises effecting a change or conversion in a hydrocarbon fluid flowing in a continuous flow path, interposing in said path, at a point subsequent to the initiation of said change or conversion, at least one flow-responsive element, determining the weight-rate of flow of said hydrocarbon fluid through said element, and correlating the manifestation of said flow-responsive element with said weight-rate, to determine the insitu density of the hydrocarbon at the locality of said element.

2. In the processing of a stream of petroleum to effect conversion thereof, the method of determining the in situ density of said petroleum while undergoing such conversion, which method comprises flowing said petroleum in a continuous stream into and through a conversion zone, determining the weight-rate of flow of petroleum in said zone, treating the petroleum flowing through said zone to effect conversion thereof, passing said stream of petroleum, after the initiation of said conversion, continuously through at least one flow-responsive element, and correlating said weight-rate with the indication or manifestation of said flow-responsive element, to determine the density of the fluid at the point where said flow-responsive element is located.

3. In the processing of a stream of petroleum to effect conversion thereof, the method of determining the in situ density of said petroleum while undergoing such conversion, which method comprises flowing said petroleum in a continuous stream into and through a processing zone, determining the weight-rate of flow of the fluid in said zone, treating the petroleum flowing through said zone, restricting the flow of said petroleum at at least one selected point in said zone, determining the differential pressure across said restriction in the fluid stream as the fluid flows continuously therethrough, and correlating said weight-rate with said pressure differential to determine the density of the fluid at the point where said pressure differential is measured.

4. In the heat treatment of a stream of petroleum to effect a change thereof, the method of determining variations in the in situ density of the fluid at a plurality of points in said stream, which comprises maintaining a continuous stream of petroleum flowing into and through a processing zone, determining the weight-rate of flow in said zone, treating said stream while flowing through said zone, passing said stream of petroleum progressively serially through a plurality of flow-responsive elements positioned along the path of flow of said stream, and correlating the indications or manifestations of said flow-responsive elements with said weight-rate of flow, to determine variations in in situ density of the petroleum at the locations of said elements.

5. In the processing of a stream of petroleum to effect cracking thereof, the method of determining variations in the in situ density of said petroleum while undergoing such cracking, which method comprises flowing said petroleum in a continuous stream into and through a treating zone, determining the weight-rate of flow of petroleum in said zone, treating or processing the petroleum flowing through said zone to effect cracking thereof, restricting the flow of said petroleum at at least one selected point in said zone subsequent to the initiation of cracking, determining the differential pressure across said restriction as the fluid flows continuously therethrough, and correlating said weight-rate with said pressure differential, to determine variations in the density of the fluid flowing through said restriction.

6. A method which includes flowing a hydrocarbon fluid in a continuous stream serially through a primary treating zone and thence through a secondary treating zone, determining the weight-rate of flow of said hydrocarbon in said zones, heating said hydrocarbon in said first zone, passing said hydrocarbon from said primary zone through a flow-responsive element and thence into said secondary zone, effecting further conversion of the hydrocarbon while in said secondary zone, passing said hydrocarbon from said secondary zone through another flow-responsive element, and correlating said weight-rate with the manifestations of said flow-responsive elements, to determine the mean in situ density of the fluid within said secondary zone.

7. A method which includes flowing a hydrocarbon fluid through a continuous flow path, effecting a change or conversion in said fluid while flowing in said path, determining the weight-rate of flow of said hydrocarbon in said path, determining the mean in situ density of the hydrocarbon in said path by passing the same through at least one flow-responsive element located in said path, and correlating said weight-rate with the volume of said path and said mean density to determine the time of detention or treatment of said hydrocarbon in said path.

8. A method which includes flowing a hydrocarbon fluid through a continuous flow path comprising a primary treating zone and a secondary treating zone, determining the weight-rate of flow of said fluid in said path, heating said hydrocarbon in said first zone, passing said hydrocarbon from said first zone through a flow-responsive element and thence into a secondary zone, effecting further conversion of the hydrocarbon while in said secondary zone, passing said hydrocarbon from said secondary zone through another flow-responsive element, and correlating said weight-rate with the manifestations of said flow-responsive elements and the volume of said secondary zone to determine the time of detention or treatment of the fluid within said secondary zone.

9. In the processing of a stream of petroleum, the method of controlling the extent or degree of said processing, which comprises flowing said petroleum continuously into and through a processing zone, determining the weight-rate of flow through said zone, processing the petroleum flowing through said zone, passing said stream of petroleum, after the initiation of said processing, continuously at a known weight rate through at least one flow-responsive element, and regulating the operating conditions in said zone substantially to maintain a predetermined optimum relationship between said rate of flow and the indication or manifestation of said flow-responsive element.

10. In the processing of a stream of petroleum to effect a chemical and physical conversion therein, the method of controlling the extent or degree of said conversion, which comprises flowing said petroleum in a continuous stream into and through a conversion zone, determining the weight-rate of flow of petroleum through said zone, treating the petroleum flowing through said conversion zone to effect a physical and chemical conversion thereof, restricting the flow of said stream at at least one predetermined point in said conversion zone subsequent to the initiation of said conversion, determining the differential pressure across said restriction as the fluid flows continuously at a known weight rate therethrough, and regulating the operating conditions substantially to maintain a predetermined optimum relationship between said rate of flow and said pressure differential.

11. In the cracking of a hydrocarbon fluid in a continuous flow system, the method of controlling the extent or degree of said cracking, which comprises determining the convertibility characteristics of said fluid prior to treatment, flowing said fluid in a continuous stream into and through a conversion zone, determining the weight-rate of flow of fluid through said zone, treating said fluid in said zone to effect cracking thereof, determining the temperature of the fluid at at least one point in said zone, causing said fluid, after the initiation of said cracking reaction, to flow at a known weight rate through at least one flow-responsive element, and regulating the operating conditions substantially to maintain a predetermined optimum relationship between said convertibility characteristics, said temperature, said weight-rate, and the manifestation of said flow-responsive element.

12. The method of regulating the treatment of a hydrocarbon fluid undergoing processing in a continuous flow path, which method comprises determining, from the relation between the manifestation of a flow-responsive element located in said path and the weight-rate of flow therethrough, the in situ density of the fluid undergoing processing, and regulating the operating conditions in accordance with such density.

13. The method of maintaining balanced operating conditions for a plurality of hydrocarbon treating paths, all of which are discharged into a single zone wherein observations of the fluid are not indicative of the conditions existing in the individual paths, which method comprises determining, from the relation between the manifestations of a flow-responsive element and the weight-rate of flow therethrough, variations in the in situ density of the hydrocarbon in each path at at least one point therein subsequent to the initiation of the change in said path, and controlling the treatment in the individual fluid paths in accordance with said density of the fluid in said individual path.

14. In the processing of a stream of petroleum to effect a change thereof, the method of controlling the extent or degree of said change, which comprises flowing said petroleum in a continuous stream into and through a conversion zone, determining the weight-rate of flow in said zone, treating the petroleum flowing through said conversion zone to effect a conversion thereof, passing said stream of petroleum, after the initiation of the conversion therein, continuously through at least one flow-responsive element, correlating said weight-rate with the indication or manifestation of said flow-responsive element to determine the in situ density of the fluid flowing therethrough, and regulating the treatment or processing the said stream of petroleum in said zone substantially to maintain said density at a predetermined optimum value.

15. In the heat treatment of a stream of petroleum to effect a change thereof, the method of controlling the extent or degree of said treatment, which comprises flowing said petroleum in a continuous stream into and through a processing zone, passing said stream of petroleum, at a point in said stream where the density of the fluid is known, continuously through a flow-responsive element, treating the petroleum flowing through said zone to effect a change therein, passing said stream of petroleum, after the initiation of said change therein, continuously through at least one other flow-responsive element, correlating the indications of said flow-metering elements with the known density of the fluid flowing through said first-mentioned element, to determine the density of the fluid passing through said second-mentioned flow-responsive element, and regulating the treatment of said stream substantially to maintain said density at a predetermined optimum value.

16. In the processing of a stream of petroleum to effect a change thereof, the method of controlling the extent or degree of said change, which comprises flowing said petroleum in a continuous stream into and through a processing zone, determining the weight-rate of flow of petroleum in said zone, processing the petroleum flowing through said zone to effect a change therein, restricting the flow of said stream, at at least one predetermined point in said zone subsequent to the initiation of said change, measuring the differential pressure across said restriction as the fluid flows continuously therethrough, correlating said weight-rate with said pressure differential to determine the in situ density of the petroleum flowing through said restriction, and regulating the processing substantially to maintain said density at a predetermined optimum value.

17. The method of claim 9 wherein said change or conversion includes a chemical conversion of said hydrocarbon in the presence of added normally gaseous hydrocarbons.

18. In the art of processing a flowing stream of petroleum, the method of controlling the operation in a cracking furnace having a section wherein substantially all the heat absorbed is evidenced by a temperature rise and a section wherein the major proportion of the chemical conversion takes place, which comprises arriving at the existing density of the fluid at the outlet of said first-named section and also at the outlet of said second-named section by causing all of said fluid to pass continuously through flow-metering elements positioned at said points and then utilizing the said density determinations to maintain optimum conditions in the cracking furnace.

19. In the art of processing a flowing stream of petroleum, the method of controlling the operation in a cracking furnace having a section wherein the major proportion of the chemical conversion takes place, which comprises arriving at the existing density of the fluid at points selected as the inlet and outlet of said section by causing all of said fluid to pass continuously through flow-metering elements positioned along the path of flow, utilizing the said determined densities at the inlet and outlet of said section as a basis for arriving at the means density therein, and maintaining a predetermined optimum mean density in said section.

20. In the heat treatment of a stream of petroleum to effect a change thereof, the method of controlling the extent or degree of said change, which comprises, flowing said petroleum in a continuous stream into and through a processing zone, measuring the rate of flow of petroleum in said zone, treating the petroleum flowing through said zone to effect a change therein, restricting the flow of said stream at points selected as the inlet and outlet of said zone, measuring the pressure differentials across said restrictions in the stream as the fluid flows continuously and progressively serially therethrough, correlating the measured rate of flow with the measured pressure differentials to determine the mean in situ density of the fluid in said zone, and regulating the treatment of said petroleum substantially to maintain said mean density at a predetermined optimum value.

21. The method of regulating the conversion of a hydrocarbon fluid within a continuous flow path wherein said fluid is subjected to treatment in a treating zone, which comprises effecting conversion of the fluid in said zone, determining the temperature of the fluid at a selected point within said zone, determining—from the manifestation of at least one flow-responsive element located in said path at a point subsequent to the initiation of said conversion—variations in the means in situ density and the time of detention of said hydrocarbon within said zone, and regulating the treatment substantially to maintain a predetermined relationship between said time of detention and said temperature.

22. Apparatus for the treatment of hydrocarbon fluids to effect conversion thereof, comprising in combination, a continuous flow path including a zone wherein said hydrocarbon may be treated, means for determining the weight-rate of flow of the hydrocarbon in said zone, a flow-responsive element located at at least one predetermined point in said path subsequent to the entrance of said zone, and means for correlating the indication of said weight-rate determining means with the manifestation of said flow-responsive element, for indicating variations in the in situ density of the hydrocarbon flowing through said flow-responsive element.

23. A hydrocarbon treating system comprising, in combination, a continuous flow path including a preliminary processing zone and a secondary processing zone, means for determining the weight-rate of flow in said zones, flow-responsive means located in said path intermediate said preliminary and the secondary zones, at least one other flow-responsive means located in said path at a point subsequent to the entrance of said secondary zone, and means correlating the manifestation of said flow-responsive means with said weight-rate determining means, for indicating variations in the mean in situ density of the hydrocarbon in said secondary zone.

24. A hydrocarbon treating system comprising, in combination, a continuous flow path including a treating zone wherein said hydrocarbon is subject to treatment, means for indicating the mean in situ density of the fluid within said zone, means responsive to variations in the weight-rate of flow of the hydrocarbon in said flow path, and means correlating the manifestations of said mean density-indicating means and said weight-rate responsive means to indicate variations in the time of detention of the hydrocarbon within said zone.

25. A hydrocarbon treating system comprising, in combination, a continuous flow path including a treating zone wherein said hydrocarbon is subjected to treatment, flow-responsive means located in said zone at a point where the existing in situ density is substantially representative of the mean density of the hydrocarbon in said zone, means responsive to variations in the weight-rate of flow in said zone, and means correlating the manifestations of said flow-responsive means with said weight-rate responsive means, to indicate varations in the time of detention of the hydrocarbon within said zone.

26. A hydrocarbon treating system comprising, in combination, a continuous flow path including a preliminary treating zone and a secondary treating zone, means for determining variations in the weight-rate of flow of said hydrocarbon in said zones, a flow-responsive element located in said path at a point intermediate said preliminary and secondary zones, another flow-responsive element located in said path at the exit of said secondary zone, and means correlating the manifestations of said weight-rate determining means with the manifestations of said flow-responsive elements to indicate variations in the time of detention of the fluid within said secondary zone.

27. A hydrocarbon treating system comprising, in combination, a continuous flow path including a treating zone wherein said hydrocarbon may be subjected to treatment, means for continuously determining the time of detention of the hydrocarbon in said zone, means responsive to variations in the temperature of the hydrocarbon at at least one selected point in said zone, and means correlating the manifestations of said time-determining means and said temperature-responsive means to indicate variations in the degree of conversion or yield per pass of a selected hydrocarbon fluid passing through said zone.

28. The apparatus of claim 27 wherein said correlating means is provided with means for adjusting the response thereof in accordance with the characteristics of the hydrocarbon entering said system, whereby to provide an indication of variations in the degree of conversion or yield per pass for various types of charging stocks.

29. A fluid hydrocarbon treating system comprising a plurality of fluid hydrocarbon treating paths, a zone in which the hydrocarbon fluids from the paths may be merged, means for determining the weight-rate of flow in each of said paths, and means comprising a flow-responsive element located at at least one selected point in each path subsequent to the entrance of said treating zone, from which the in situ density of the hydrocarbon fluid in said individual paths may be obtained for permitting the ascertainment of the characteristics of the reaction and the degree of treatment in said individual paths, despite the subsequent combination of the products from said paths into a single zone.

30. In the treatment of a stream of flowing hydrocarbon fluid to effect a change thereof or conversion therein, the method of controlling the degree of said change or conversion which comprises determining the convertibility characteristics of said fluid, flowing said fluid in a restricted stream through a flow-responsive element, passing said fluid through a change or conversion zone, effecting a change or conversion of the fluid flowing through said zone, determining the temperature of the fluid at a selected point in said zone, passing all of said fluid, subsequent to the initiation of said change or conversion, through a flow-responsive element, and regulating the treatment or processing of said fluid substantially to maintain a selected relationship between said convertibility characteristics, said temperature, and the manifestations of said flow-responsive elements.

31. In the pyrolysis of a hydrocarbon-containing fluid, the method of controlling the degree of said pyrolysis which comprises obtaining a measure of the average paraffinicity and a measure of the average molecular weight of said fluid, flowing said fluid in a restricted stream into and through a change or conversion zone, determining the weight-rate of flow of said fluid through said zone, effecting a change or conversion in said fluid flowing through said zone, determining the temperature of the fluid at a selected point in said zone, passing all of said fluid, subsequent to the initiation of said change or conversion, through a flow-responsive element, and regulating treatment or processing of said fluid substantially to maintain a selected relationship between said measures of the paraffinicity and molecular weight, said weight-rate, said temperature, and the manifestation of said flow-responsive element.

32. The method of claim 31 wherein said measures of the average paraffinicity and average molecular weight of said fluid comprise the iodine number and gravity of said fluid, respectively.

33. The method of claim 31 wherein said measures of the average paraffinicity and average molecular weight of said fluid comprise the aniline number and gravity of said fluid, respectively.

34. In the processing of a stream of hydrocarbon fluid to effect a change thereof, the method of controlling the extent or degree of said change, which comprises determining the convertibility characteristics of said fluid, flowing said fluid in a continuous stream into and through a conversion zone, determining the weight-rate of flow through said zone, treating the fluid flowing through said conversion zone to effect a conversion thereof, passing said stream of fluid, after the initiation of conversion therein, continuously through at least one flow-responsive element, correlating said weight-rate with the indication or manifestation of said flow-responsive element to determine the in situ density of the fluid flowing therethrough, determining the temperature of the fluid at a selected point within said conversion zone, and regulating the treatment or processing of said stream of fluid in said zone substantially to maintain a predetermined optimum relationship between said convertibility characteristics, said density, and said temperature.

35. In the processing of a stream of hydrocarbon fluid to effect a chemical and physical conversion thereof, the method of controlling the extent or degree of said conversion, which comprises determining the aniline number and the A. P. I. gravity of the hydrocarbon prior to treatment, flowing said fluid in a continuous stream into and through a conversion zone, determining the weight-rate of flow of the fluid through said zone, treating the fluid flowing through said conversion zone to effect a physical and chemical conversion thereof, determining the temperature of said fluid at a selected point within said zone, passing said stream of fluid, after the initiation of the conversion therein, continuously through at least one flow-responsive element, correlating said weight-rate with the indication or manifestation of said flow-responsive element to determine the in situ density of the fluid flowing therethrough, and regulating the treatment or processing of said stream of fluid in said zone substantially to maintain a predetermined optimum relationship between said aniline number, said A. P. I. gravity, said temperature, and said density.

36. The method of treating a flowing hydrocarbon fluid undergoing a condition change, which includes, determining the weight rate of flow of the fluid compensated for variations in density of the fluid prior to treatment, continuously determining a flow rate factor of the fluid subsequent to the treating, and controlling the treating from such evaluated density.

ROBERT L. RUDE.

CERTIFICATE OF CORRECTION.

Patent No. 2,217,636. October 8, 1940.

ROBERT L. RUDE.

It is hereby certified that error appears in the printed specification of the above numbered patent requiring correction as follows: Page 2, second column, line 48, for "proptly" read --promptly--; page 3, second column, line 10, for "temperature" read --temperatures--; page 8, line 4, Table 2, before "yield" and after "gas" insert a parenthesis; page 10, first column, line 18, for "system" read --systems--; page 14, second column, line 29, after "means" insert a parenthesis; page 22, second column, lines 17 and 48, claims 19 and 21 respectively, for "means" read --mean--; page 24, second column, line 14, claim 36, after "subsequent" insert --to treatment, correlating the determinations to evaluate density of the fluid subsequent--; and that the said Letters Patent should be read with this correction therein that the same may conform to the record of the case in the Patent Office.

Signed and sealed this 17th day of December, A. D. 1940.

(Seal)

Henry Van Arsdale,
Acting Commissioner of Patents.